United States Patent
Matsumoto

(10) Patent No.: US 8,060,294 B2
(45) Date of Patent: Nov. 15, 2011

(54) CONTROL DEVICE OF OXYGEN SENSOR FOR AUTOMOTIVE VEHICLE, AND AIR-FUEL RATIO CONTROLLER AND AUTOMOTIVE VEHICLE INCORPORATING THE SAME

(75) Inventor: Hiroshi Matsumoto, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 588 days.

(21) Appl. No.: 12/323,488

(22) Filed: Nov. 26, 2008

(65) Prior Publication Data
US 2009/0143960 A1   Jun. 4, 2009

(30) Foreign Application Priority Data
Nov. 30, 2007 (JP) ................................ 2007-310651

(51) Int. Cl.
*F02D 45/00* (2006.01)
*F02D 35/00* (2006.01)
*F02D 41/14* (2006.01)

(52) U.S. Cl. ........................ 701/109; 123/690
(58) Field of Classification Search .................. 701/109; 123/685, 690; 60/286
See application file for complete search history.

(56) References Cited

U.S. PATENT DOCUMENTS

| | | | |
|---|---|---|---|
| 5,073,247 A | | 12/1991 | Weyl |
| 5,353,774 A | * | 10/1994 | Furuya ........................ 123/685 |
| 6,068,530 A | * | 5/2000 | Ozawa ........................ 440/89 R |
| 6,304,813 B1 | * | 10/2001 | Ikeda et al. .................... 701/109 |
| 7,084,379 B2 | | 8/2006 | Saito et al. |
| 7,236,083 B2 | | 6/2007 | Izu et al. |
| 7,416,044 B2 | | 8/2008 | Tsuruta |
| 7,526,914 B2 | * | 5/2009 | Nakano ........................... 60/276 |
| 8,000,883 B2 | * | 8/2011 | Iwahashi et al. ............... 701/109 |
| 2006/0042946 A1 | * | 3/2006 | Tsukahara et al. ............ 204/424 |
| 2006/0065041 A1 | * | 3/2006 | Kono et al. ..................... 60/276 |
| 2007/0084724 A1 | * | 4/2007 | Mori et al. ..................... 204/424 |
| 2007/0178343 A1 | | 8/2007 | Muramatsu |
| 2007/0277590 A1 | | 12/2007 | Wilde |
| 2008/0256927 A1 | * | 10/2008 | Kikuchi et al. ................. 60/276 |
| 2010/0242445 A1 | * | 9/2010 | Iwahashi et al. ................ 60/286 |

FOREIGN PATENT DOCUMENTS

JP             05-18921 A          1/1993
(Continued)

OTHER PUBLICATIONS

Official communication issued in counterpart European Application No. 08020464.7, mailed on Mar. 3, 2009.

*Primary Examiner* — Stephen K Cronin
*Assistant Examiner* — Arnold Castro
(74) *Attorney, Agent, or Firm* — Keating & Bennett, LLP

(57) ABSTRACT

A control device is arranged to control an oxygen sensor for an automotive vehicle wherein the oxygen sensor has a sensor element and a heater for elevating a temperature of the sensor element. The control device includes a tilt detection section arranged to detect tilting of a vehicle body; a storage section arranged to store tilt information in accordance with a result of detection by the tilt detection section; and a control section arranged to control, at a start of an engine of the vehicle, the heater in one of a plurality of modes including a normal mode and a delay mode in which temperature elevation of the sensor element is delayed relative to the normal mode, based on the tilt information stored in the storage section.

14 Claims, 13 Drawing Sheets

FOREIGN PATENT DOCUMENTS

| | | |
|---|---|---|
| JP | 05-084852 U | 11/1993 |
| JP | 08-114571 A | 5/1996 |
| JP | 2000-310116 A | 11/2000 |
| JP | 3512392 B2 | 3/2004 |
| JP | 2004-225617 A | 8/2004 |
| WO | 03/040717 A1 | 5/2003 |

* cited by examiner

PRIOR ART

CONTROL DEVICE OF OXYGEN SENSOR FOR AUTOMOTIVE VEHICLE, AND AIR-FUEL RATIO CONTROLLER AND AUTOMOTIVE VEHICLE INCORPORATING THE SAME

BACKGROUND OF THE INVENTION

1. Field of the Invention

The present invention relates to a control device arranged to control an oxygen sensor for automotive vehicles having a heater. The present invention also relates to an air-fuel ratio controller and an automotive vehicle incorporating such a control device.

2. Description of the Related Art

From the standpoint of environmental issues and energy issues, it has been desired to improve the fuel consumption of internal combustion engines and reduce the emission amount of regulated substances (e.g., NOx) that are contained within exhaust gas from internal combustion engines. In order to meet these needs, it is necessary to appropriately control the ratio between fuel and air during combustion so that fuel combustion will occur always under optimum conditions. The ratio of air to fuel is called the "air-fuel ratio" (A/F). In the case where a ternary catalyst is employed, the optimum air-fuel ratio would be the stoichiometric air-fuel ratio. The "stoichiometric air-fuel ratio" is the air-fuel ratio at which air and fuel will combust just sufficiently.

When fuel is combusting at the stoichiometric air-fuel ratio, a certain amount of oxygen is contained within the exhaust gas. When the air-fuel ratio is smaller than the stoichiometric air-fuel ratio (i.e., the fuel concentration is relatively high), the oxygen concentration in the exhaust gas decreases relative to that under the stoichiometric air-fuel ratio. On the other hand, when the air-fuel ratio is greater than the stoichiometric air-fuel ratio (i.e., the fuel concentration is relatively low), the oxygen concentration in the exhaust gas increases. Therefore, by measuring the oxygen concentration in the exhaust gas, it is possible to estimate the deviation of the air-fuel ratio relative to the stoichiometric air-fuel ratio. This makes it possible to adjust the air-fuel ratio and control the fuel combustion so as to occur under the optimum conditions.

As oxygen sensors for measuring the oxygen concentration within exhaust gas, electromotive force-type oxygen sensors as disclosed in Japanese Laid-Open Patent Publication No. 8-114571 and resistance-type oxygen sensors as disclosed in Japanese Laid-Open Patent Publication No. 5-18921 are known. In order to obtain from an oxygen sensor an accurate sensor output which is in accordance with the oxygen concentration, it is necessary to raise the sensor element to a high temperature (e.g., 300° C. or above). Therefore, commonly-used oxygen sensors include a heater for elevating the temperature of the sensor element. By appropriately controlling the power supplied to the heater with an electronic control unit (ECU) or the like, temperature management for the sensor element is achieved.

An oxygen sensor for measuring the oxygen concentration within the exhaust gas is provided inside an exhaust pipe of an internal combustion engine, and water may accumulate in the exhaust pipe. The reason why water accumulates is that moisture contained in the gas within the exhaust pipe may become condensed after the internal combustion engine is stopped, or that the moisture in the exhaust gas that has passed into the exhaust pipe whose temperature is still low immediately after starting the internal combustion engine may become condensed. If the residual water splatters due to vibration of the internal combustion engine or flow of the exhaust gas, and water droplets adhere to the oxygen sensor whose temperature has been elevated, the oxygen sensor may be destroyed due to thermal shock (called "wet cracking").

Japanese Laid-Open Patent Publication No. 2004-225617 discloses a technique for preventing destruction of an oxygen sensor due to such wetting. According to this technique, the amount of water accumulating inside the exhaust pipe (residual amount) is inferred, and a treatment for protecting the oxygen sensor is performed in accordance with the inferred residual amount.

Inference of the residual amount is performed from time to time based on the amount of air and the amount fuel supplied to the combustion chamber of the internal combustion engine, external temperature, and the like. Then, if the residual amount is equal to or greater than a reference value, a treatment for reducing the residual amount of water is performed while stopping the power supplied to the heater, and power to the heater is started after the residual amount becomes less than the reference value.

In addition to the aforementioned causes, another cause for the accumulation of water in the exhaust pipe is toppling of a motorcycle. The technique disclosed in Japanese Laid-Open Patent Publication No. 2004-225617 is confined to inferring the amount of water accumulating within the exhaust pipe when the internal combustion engine is normally operated (i.e., the amount of water accumulating due to condensation of moisture within the gas), and does not contemplate water that enters into the exhaust pipe from the outside when a motorcycle topples. An exhaust pipe of a motorcycle is shorter than an exhaust pipe of a four-wheeled automobile, and therefore water having entered from the outside may easily reach the portion where the oxygen sensor is provided.

Many commercially-available motorcycles are equipped with a mechanism for stopping the power of the internal combustion engine and the like (including power to the heater of the oxygen sensor) in case of toppling. However, when power to the heater is resumed upon a restart, wet cracking may occur. Thus, even by using the technique of Japanese Laid-Open Patent Publication No. 2004-225617, wet cracking of an oxygen sensor cannot be sufficiently prevented.

Now, with reference to FIG. 12 to FIG. 17, the reason why the oxygen sensor of a motorcycle is likely to become wet will be described more specifically. As shown in FIG. 12, a motorcycle 500 includes an internal combustion engine 514 and an exhaust pipe 523 which is connected to the internal combustion engine 514. The motorcycle 500 further includes a muffler 524 for reducing exhaust noise.

FIG. 13 is a diagram schematically showing the internal combustion engine 514, the exhaust pipe 523, and the muffler 524 of the motorcycle 500, in particular. FIG. 14 is a cross-sectional view taken along line 14A-14A' in FIG. 13. As shown in FIG. 13, an oxygen sensor 510 for measuring the oxygen concentration in the exhaust gas is attached to the exhaust pipe 523. Although not shown herein, the top end of the oxygen sensor 510 is exposed within the exhaust pipe 523. The rear (downstream side) portion of the exhaust pipe 523 is accommodated in the muffler 524.

The inside of the muffler 524 is divided into a primary expansion chamber 524a and a secondary expansion chamber 524b by a partition 525, respectively, from the front (upstream side) side. The exhaust pipe 523 penetrates the partition 525, such that the downstream side end of the exhaust pipe 523 opens within the secondary expansion chamber 524b.

The primary expansion chamber 524a and the secondary expansion chamber 524b are in communication with each other via a communication pipe 526 which is provided so as to penetrate the partition 525. A tail pipe 527 is provided in the secondary expansion chamber 524. The tail pipe 527 penetrates the partition 525 such that the upstream side end thereof opens within the primary expansion chamber 524a. The tail pipe 527 also penetrates an outer wall 524w of the muffler 524 such that the downstream side end thereof is open outside the muffler 524. Exhaust gas which is discharged from the exhaust pipe 523 into the secondary expansion chamber 524b is introduced into the primary expansion chamber 524a through the communication pipe 526, and further passes through the tail pipe 527 so as to be externally discharged. In the primary expansion chamber 524a of the muffler 524, a drain hole 524h (which is shown in FIG. 13 larger than actual size for ease of understanding) is provided for externally discharging the water which has become condensed within the muffler 524.

FIG. 15 is a diagram showing the motorcycle 500 having toppled on the ground which is covered with water. FIG. 16 is a diagram showing a cross-section of the muffler 524 (corresponding to FIG. 14) at this time. As shown in FIG. 15, when the motorcycle 500 is toppled, water comes into the muffler 524 through the tail pipe 527 as shown in FIG. 16, so that the water accumulates inside the muffler 524. Although the muffler 524 has the drain hole 524h as shown in FIG. 13, the drain hole 524h only has a small radius (with a diameter of about 1 to 2 mm) in order to prevent a large amount of exhaust gas from leaking therethrough, and therefore does not have the ability to sufficiently discharge the water which has flowed into the muffler in the case of toppling.

When the body of the motorcycle 500 is set upright with the water accumulated within the muffler 524, as shown in FIG. 17, the water inside the muffler 524 flows toward the upstream side of the exhaust pipe 523. If a large amount of water flows into the exhaust pipe 523, the water may reach the portion of the oxygen sensor 510 protruding into the exhaust pipe 523. Therefore, when power to the heater is resumed at the time of a restart, wet cracking may occur.

SUMMARY OF THE INVENTION

In order to overcome the problems described above, preferred embodiments of the present invention prevent wet cracking of an oxygen sensor associated with water which has entered into an exhaust pipe from the outside due to tilting of a vehicle body.

A control device according to a preferred embodiment of the present invention controls an oxygen sensor for an automotive vehicle, wherein the oxygen sensor has a sensor element and a heater for elevating a temperature of the sensor element, the control device including a tilt detection section arranged to detect a tilting of a vehicle body; a storage section arranged to store tilt information in accordance with a result of detection by the tilt detection section; and a control section arranged to control, at a start, the heater in one of a plurality of modes including a normal mode and a delay mode in which temperature elevation is delayed relative to the normal mode, based on the tilt information stored in the storage section.

In a preferred embodiment, the control section ensures that a duty ratio for the heater preferably is about 10% or less in the delay mode, for example.

In a preferred embodiment, the control section does not supply power to the heater for heating in the delay mode.

In a preferred embodiment, when the tilt information indicates toppling of the vehicle body, the control section controls the heater in the delay mode from the start and until a predetermined time has elapsed.

In a preferred embodiment, when the tilt information indicates toppling of the vehicle body, the control section controls the heater in the delay mode for a period from the start and until an operation amount of an internal combustion engine reaches a predetermined amount.

In a preferred embodiment, the period is from the start and until a time quadrature value of a revolution rate of the internal combustion engine reaches a predetermined value.

In a preferred embodiment, when the tilt information indicates toppling of the vehicle body, the control section controls the heater in the delay mode from the start and until a temperature of the sensor element has reached a predetermined temperature.

In a preferred embodiment, the control section infers the temperature of the sensor element based on a measurement value of a temperature sensor provided near the oxygen sensor.

In a preferred embodiment, the control section infers the temperature of the sensor element based on an internal resistance value of the sensor element.

In a preferred embodiment, the control section infers the temperature of the sensor element based on a resistance value of the heater.

In a preferred embodiment, the sensor element contains a temperature compensation material arranged to compensate for a temperature dependence of a sensor output, and the control section infers the temperature of the sensor element based on a resistance value of the temperature compensation material.

Alternatively, the control device according to another preferred embodiment of the present invention controls an oxygen sensor for an automotive vehicle, wherein the oxygen sensor has a sensor element and a heater for elevating a temperature of the sensor element, the control device including a tilt detection section arranged to detect a tilting of a vehicle body; a storage section arranged to store tilt information in accordance with a result of detection by the tilt detection section; and a control section arranged to control, at a start, the heater based on the tilt information stored in the storage section, wherein, when the tilt information indicates toppling of the vehicle body, the control section ensures that electric power supplied to the heater is temporarily suppressed relative to when the tilt information does not indicate toppling of the vehicle body.

An air-fuel ratio controller according to a preferred embodiment of the present invention includes a control device having the above construction.

An automotive vehicle according to a preferred embodiment of the present invention includes an air-fuel ratio controller having the above construction.

In a preferred embodiment, the automotive vehicle is a saddle riding vehicle.

In a preferred embodiment, the automotive vehicle further includes an exhaust pipe, wherein the exhaust pipe extends obliquely upward at a downstream side.

A control device according to another preferred embodiment of the present invention includes a tilt detection section arranged to detect a tilting of a vehicle body and a storage section arranged to store tilt information in accordance with a result of detection by the tilt detection section, and further includes a control section arranged to control, at a start, the heater in one of a plurality of modes including a "normal mode" and a "delay mode", based on the tilt information. As used herein, the "delay mode" is a mode where elevation of the temperature is delayed relative to the normal mode. Since the control device according to a preferred embodiment of the present invention includes such a control section, at the time of starting after a tilting equal to or greater than a certain level is detected (i.e., when there is a high likelihood that water has entered into the exhaust pipe from the outside), the control device is able to control the heater in the delay mode. Therefore, wet cracking of an oxygen sensor associated with water which has entered into the exhaust pipe due to tilting of the vehicle body can be prevented.

The control section may ensure that the duty ratio (powering time) for the heater preferably is about 10% or less, for example, in the delay mode, whereby the temperature elevation can be sufficiently delayed relative to the normal mode. The control section may not supply power to the heater for heating in the delay mode (i.e., the duty ratio being substantially 0%), whereby destruction of the oxygen sensor (wet cracking) can be prevented with a greater certainty.

For example, when the tilt information indicates toppling of the vehicle body, the control section controls the heater in the delay mode from the start until a predetermined time has elapsed. The time for which the heater is to be controlled in the delay mode is set to a length of time which sufficiently allows the water accumulated in the exhaust pipe to decrease due to a flow of the exhaust gas after the start. Through such control by the control section, a full-scale temperature elevation by the heater is performed only after the residual amount of the water in the exhaust pipe has sufficiently decreased, whereby wet cracking of the oxygen sensor can be minimized and prevented.

When the tilt information indicates toppling of the vehicle body, the control section may control the heater in the delay mode for a period from the start and until an operation amount of the internal combustion engine reaches a predetermined amount. As the operation amount of the internal combustion engine increases, the water having entered from the outside into the exhaust pipe will decrease. Therefore, by performing a control in the delay mode until the operation amount reaches the predetermined amount, wet cracking of the oxygen sensor can be prevented.

As a parameter representing an operation amount of the internal combustion engine, a time quadrature value of the revolution rate of the internal combustion engine can be used, for example. In the case of using a time quadrature value of the revolution rate, the period for which the heater is controlled in the delay mode is a period from the start and until the time quadrature value of the revolution rate of the internal combustion engine reaches the predetermined value.

Alternatively, when the tilt information indicates toppling of the vehicle body, the control section may control the heater in the delay mode after the start and until the temperature of the sensor element reaches a predetermined temperature. Because the water having entered into the exhaust pipe from the outside will have sufficiently decreased by the time the temperature of the sensor element reaches a predetermined temperature due to the heat of the exhaust gas after the start, wet cracking of the oxygen sensor can be prevented by performing a control in the delay mode until the temperature of the sensor element reaches the predetermined temperature.

The temperature of the sensor element can be inferred by various techniques. For example, the control section may infer the temperature of the sensor element based on the measurement value of a temperature sensor which is provided near the oxygen sensor, or infer the temperature of the sensor element based on an internal resistance value of the sensor element. Alternatively, the control section may infer the temperature of the sensor element based on a resistance value of the heater. In the case where the sensor element contains a temperature compensation material arranged to compensate for the temperature dependence of a sensor output, the control section may infer the temperature of the sensor element based on a resistance value of the temperature compensation material.

A control device according to a preferred embodiment of the present invention is suitably used for an air-fuel ratio controller arranged to control the air-fuel ratio of an internal combustion engine. An air-fuel ratio controller having the control device according to a preferred embodiment of the present invention can be used in various kinds of automotive vehicles, and is especially suitably used for saddle riding vehicles such as motorcycles. In a saddle riding vehicle in which an exhaust pipe extends obliquely upward at the downstream side, water is likely to remain in an accumulated state near the oxygen sensor when the toppled vehicle body is set upright, which adds to the benefits and advantages of the preferred embodiments of the present invention.

According to preferred embodiments of the present invention, wet cracking of an oxygen sensor associated with water which has entered into an exhaust pipe from the outside due to tilting of a vehicle body can be reliably and effectively prevented.

Other features, elements, steps, characteristics and advantages of the present invention will become more apparent from the following detailed description of preferred embodiments of the present invention with reference to the attached drawings.

DETAILED DESCRIPTION OF PREFERRED EMBODIMENTS

Figure 1:
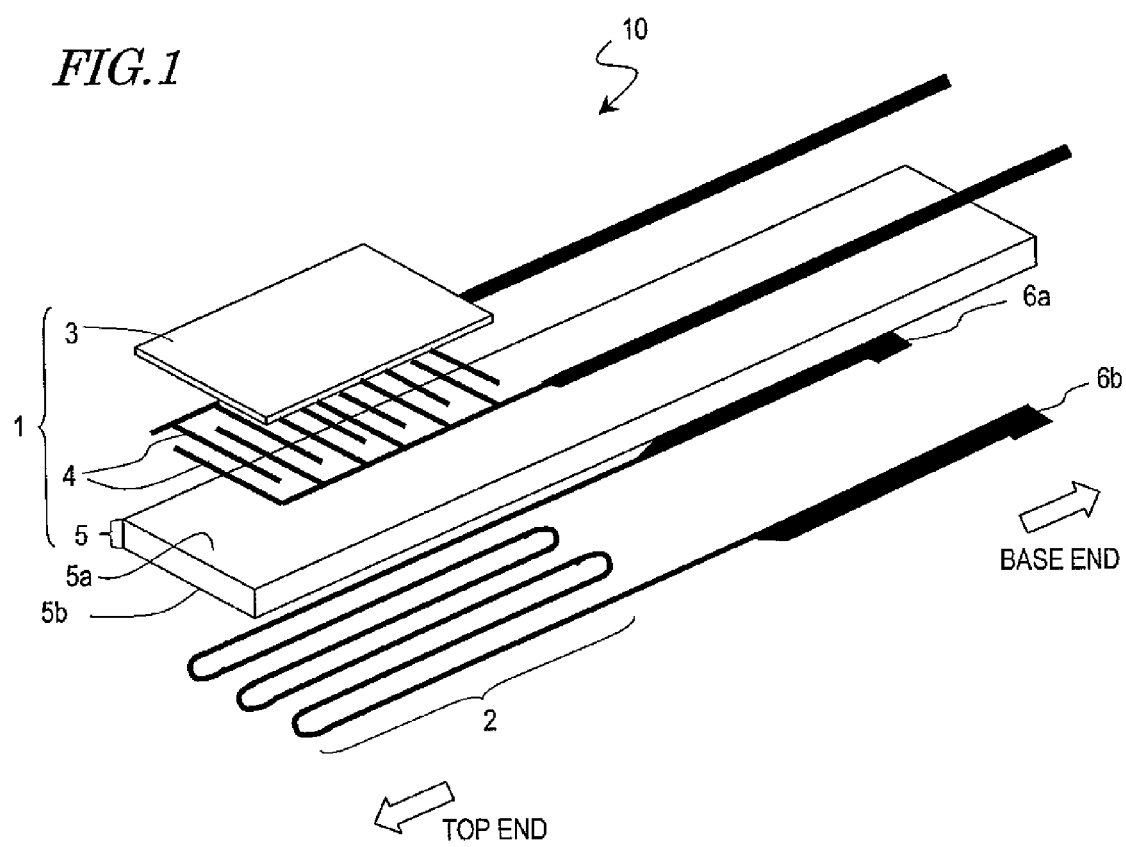
FIG. 1 is an exploded perspective view schematically showing an oxygen sensor.

Hereinafter, preferred embodiments of the present invention will be described with reference to the accompanying drawings. Note that the present invention is not limited to the preferred embodiments described below.

Prior to describing a control device according to the present preferred embodiment, the structure of an oxygen sensor for automotive vehicles, which is the subject of the control device, will first be described with reference to FIG. 1. The oxygen sensor 10 shown in FIG. 1 includes a sensor element 1 and a heater 2 for elevating the temperature of the sensor element 1.

The sensor element 1 detects the concentration or amount of oxygen contained in the atmosphere which is in contact with the sensor element 1. The sensor element 1 exemplified in FIG. 1 is a so-called resistance type, and includes an oxide semiconductor layer 3, electrodes 4 arranged to detect a resistance value of the oxide semiconductor layer 3, and a substrate 5 supporting them.

The oxide semiconductor layer 3 has a porous structure, and releases or absorbs oxygen in accordance with an oxygen partial pressure in the atmosphere. As a result, the oxygen concentration in the oxide semiconductor layer 3 changes whereby the resistance value (resistivity) of the oxide semiconductor layer 3 changes. As the material of the oxide semiconductor layer 3, titania (titanium dioxide) or ceria (cerium oxide) can be used, for example. From the standpoint of durability and stability, it is preferable that the oxide semiconductor layer 3 contains about 50 wt % or more of ceria, for example.

The electrodes 4 are arranged so as to be in contact with the oxide semiconductor layer 3. The electrodes 4 are made of a metal material such as platinum, a platinum-rhodium alloy, or gold, for example. It is preferable that the electrodes 4 are arranged in an interdigitated fashion as shown in FIG. 1, so as to be able to efficiently measure changes in the resistance value of the oxide semiconductor layer 3.

The substrate 5 has a principal surface 5a and a rear surface 5b opposing each other, such that the oxide semiconductor layer 3 and the electrodes 4 are provided on the principal surface 5a. The substrate 5 is made of an insulator (preferably a ceramic material), such as alumina or magnesia.

The heater 2 is a heating element of a resistance-heating type which achieves heating by utilizing resistance loss. Specifically, the heater 2 is a resistor which is made of a metal material such as platinum or tungsten or an oxide conductor such as rhenium oxide. By elevating the temperature of the sensor element 1 with the heater 2, it becomes possible to promptly activate the oxide semiconductor layer 3.

Moreover, the heater 2 changes its resistance value depending on temperature. Therefore, by measuring the resistance value of the heater 2, it becomes possible to detect the temperature of the heater 2. Since the heater 2 and the sensor element 1 are in contact with each other, the temperature of the sensor element 1 can be detected by detecting the temperature of the heater 2. In other words, the heater 2 is used not only as a "heating element" for elevating the temperature of the sensor element 1, but also as a "temperature detection element" arranged to detect the temperature of the heater 2 and the sensor element 1.

The heater 2 is provided on the rear surface 5b side of the substrate 5. Both ends of the heater 2 are connected to electrodes 6a and 6b, as shown in FIG. 1. The electrodes 6a and 6b are arranged to supply electric power to the heater 2 (power for heating) and also arranged to detect the temperature of the heater 2 by measuring the resistance value of the heater 2. Preferably, the electrodes 6a and 6b are formed integrally with the heater 2.

Although not illustrated in the figures, it is preferable that a catalyst layer is provided on the oxide semiconductor layer 3. The catalyst layer contains a catalytic metal. Due to the catalytic action of the catalytic metal, at least one kind of substance other than the gas to be detected (i.e., oxygen) is decomposed. Specifically, any gas or microparticles (e.g., the hydrocarbon which has failed to completely combust, carbon, and nitrogen oxide) which may unfavorably affect the oxygen detection by the sensor element 1 is decomposed, whereby such gas or microparticles are prevented from attaching to the surface of the oxide semiconductor layer 3. As a catalytic metal, platinum may be used, for example.

The oxygen sensor 10 for automotive vehicles mentioned above is provided within an exhaust pipe through which the exhaust gas from the internal combustion engine passes, and detects an oxygen concentration in the exhaust gas. Typically, the oxygen sensor 10 has a housing (not shown) in which the sensor element 1 and the heater 2 are accommodated, such that the entire housing is affixed to the exhaust pipe. At the top of the housing, the top end of the sensor element 1 (i.e., the region where the oxide semiconductor layer 3 is provided) is exposed, and a cover member (not shown) is arranged so as to cover this exposed portion. An aperture (vent hole) for allowing exhaust gas to be introduced inside is provided in the cover member. Although a resistance-type sensor element 1 is illustrated herein, an electromotive force-type sensor element having a solid electrolyte layer may be used. An electromotive force-type sensor element is disclosed in Japanese Laid-Open Patent Publication No. 8-114571, for example.

Next, with reference to FIG. 2, a control device 100 according to the present preferred embodiment will be described. The control device 100 controls the oxygen sensor 10 having the sensor element 1 and the heater 2 as shown in FIG. 1. The sensor element 1 is electrically connected to the control device 100 via the electrodes 4, and the heater 2 is electrically connected to the control device 100 via the electrodes 6a and 6b. Moreover, the control device 100 is also an internal combustion engine control device arranged to control the internal combustion engine of an automotive vehicle. Stated otherwise, in the present preferred embodiment, the internal combustion engine control device functions also as a device arranged to control the oxygen sensor 10.

The control device 100 of the present preferred embodiment includes a tilt detection section arranged to detect a tilting of a vehicle body, a storage section arranged to store tilt information in accordance with the result of detection by the tilt detection section, and a control section arranged to control the heater 2 based on the tilt information stored in the storage section. In the construction exemplified in FIG. 2, a tilt sensor 15, a random access memory (RAM) 22, and a central processing unit (CPU) 20 (which will be described below) preferably correspond to the tilt detection section, the storage section, and the control section, respectively, for example.

When the internal combustion engine is started, the control section of the control device 100 controls the heater in one of a plurality of modes, including a normal mode and a delay mode, based on the tilt information. The normal mode is a mode in which power to the heater 2 for heating is normally performed. On the other hand, the delay mode is a mode in which temperature elevation is delayed relative to the normal mode. Specifically, in the delay mode, power to the heater 2 is performed in such a manner that the timing of beginning the temperature elevation and/or the rate of temperature elevation will be slower than in the normal mode. Note that control modes other than the normal mode and the delay mode may also exist.

Since the control device 100 of the present preferred embodiment has such a control section, the heater 2 can be controlled in the delay mode at a start after a tilting that is equal to or greater than a certain level is detected (i.e., when there is a high likelihood that water from the outside has entered into the exhaust pipe). As a result, wet cracking of the oxygen sensor 10 associated with water which has entered into the exhaust pipe due to tilting of the vehicle body can be reliably prevented.

Hereinafter, a more specific construction of the control device 100 will be described.

Figure 2:
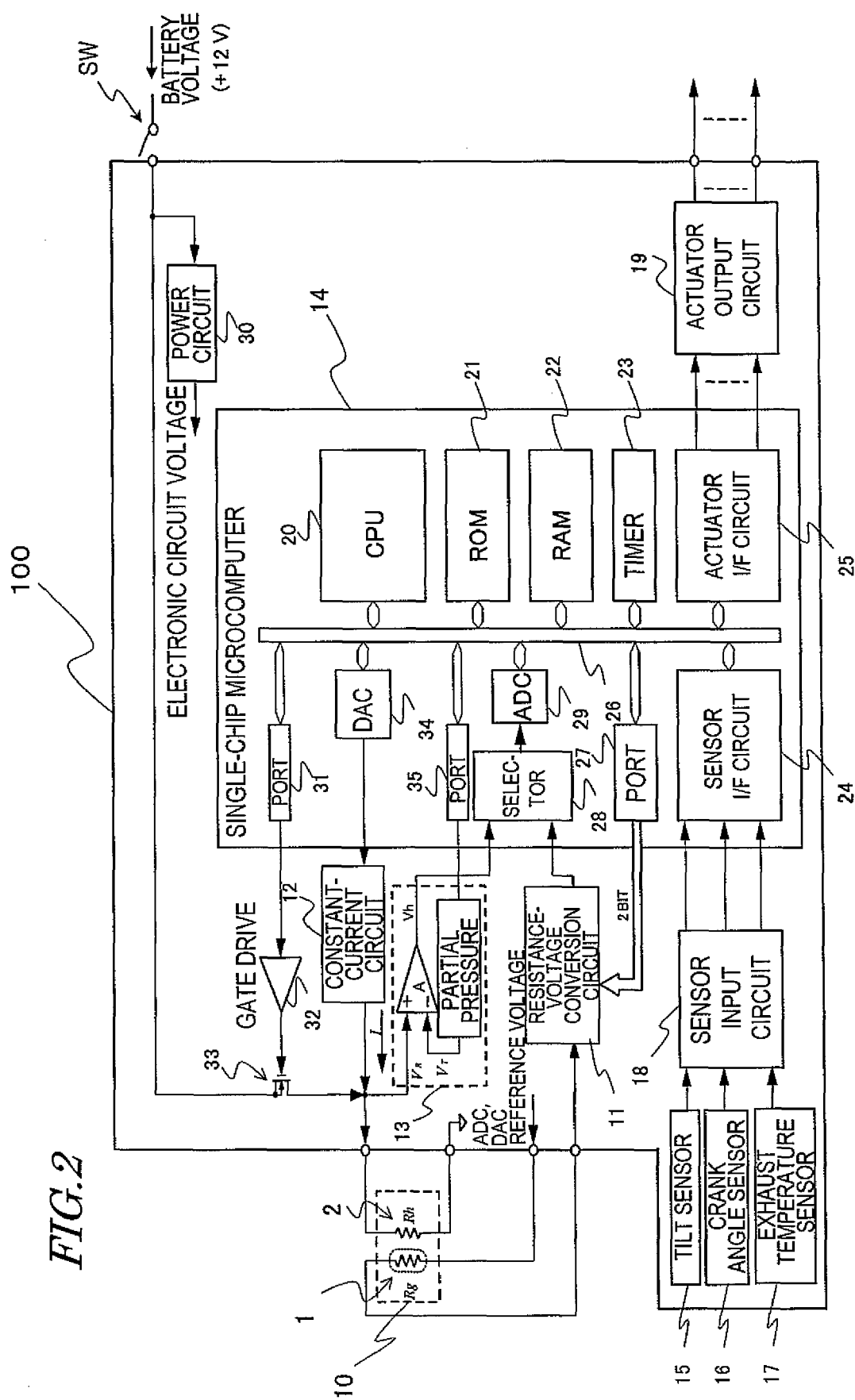
FIG. 2 is a block diagram schematically showing a control device according to a preferred embodiment of the present invention.

As shown in FIG. 2, the control device 100 includes a resistance-voltage conversion circuit 11 which is connected to the sensor element 1, a constant-current circuit 12 and an end-to-end voltage detection circuit 13 which are connected to the heater 2, and a controller 14 which receives the outputs from the resistance-voltage conversion circuit 11 and the end-to-end voltage detection circuit 13. The controller 14 in the present preferred embodiment is preferably implemented as a single-chip microcomputer, for example.

The control device 100 further includes the tilt sensor 15, various sensors including a crank angle sensor 16 and an exhaust temperature sensor 17 (among which a throttle sensor, a water temperature sensor, and the like are not shown), and a sensor input circuit 18 which is connected to these sensors. The tilt sensor 15 detects tilting of the vehicle body. The crank angle sensor 16 detects an angle of rotation of a crankshaft, and the exhaust temperature sensor 17 detects a temperature of the exhaust gas. The output from the sensor input circuit 18 is also input to the controller 14. An actuator output circuit 19 is also connected to the controller 14, and the operations of the respective sections of the internal combustion engine are controlled based on the output from the actuator output circuit 19.

As mentioned earlier, the controller 14 is preferably implemented as a single-chip microcomputer, and includes the CPU 20, a read only memory (ROM) 21, the RAM 22, a timer 23, a sensor I/F (interface) circuit 24, an actuator I/F circuit 25, and the like. Exchange of commands from the CPU 20, data having been read from the ROM 21, and the like is performed via a data bus line 26. The sensor I/F circuit 24, which includes an analog-digital converter (ADC), a timer, a port, etc., is connected to the sensor input circuit 18. The actuator I/F circuit 25, which includes a digital-analog converter (DAC), a timer, a port, etc., is connected to the actuator output circuit 19.

The resistance-voltage conversion circuit 11 measures the internal resistance value of the sensor element 1, i.e., a resistance value Rg of the oxide semiconductor layer 3, and outputs a voltage which is in accordance with the measured resistance value Rg (resistance-voltage conversion). The resistance-voltage conversion circuit 11 is controlled based on data (e.g., 2 bit data) which is generated inside the controller 14 and fed from a port 27. By measuring the resistance value Rg of the oxide semiconductor layer 3 with the resistance-voltage conversion circuit 11, it becomes possible to determine an oxygen concentration within the ambient gas. The output (voltage) from the resistance-voltage conversion circuit 11 connected to the sensor element 1 is input to an ADC 29 via a selector 28. From the ADC 29, a digital value (a value indicating the oxygen concentration) corresponding to the output (analog value) from the resistance-voltage conversion circuit 11 is output to the data bus line 26.

The end-to-end voltage detection circuit 13 detects a voltage (end-to-end voltage) $V_R$ which is being applied to both ends of the heater 2 when a predetermined level of current (constant current) I is supplied to the heater 2. Since the end-to-end voltage $V_R$ of the heater 2 depends on the temperature, the temperature of the heater 2 can be determined from the detected voltage value. Since the heater 2 is in contact with the sensor element 1, by detecting the temperature of the heater 2 and controlling the temperature of the heater 2 to be within a predetermined range, it becomes possible to also control the temperature of the sensor element 1 (as well as the temperature of the oxide semiconductor layer 3, which is in thermal contact with the heater 2 via the thin substrate 5) to be within an appropriate range.

In addition to the constant-current circuit 12 arranged to apply a constant current to the heater 2, the control device 100 includes a power circuit 30 arranged to generate a power voltage which is necessary for the operation of each electronic circuit within the control device 100, the power circuit 30 being connected to a +12V power source (battery), for example. Whereas the current which is supplied from the power source to the heater 2 is used for heating the heater 2, the current which is supplied from the constant-current circuit 12 to the heater 2 is used for measuring the resistance value of the heater 2. Note that ON/OFF of the electrical connection between the control device 100 and the power source is switched by a main switch SW of the automotive vehicle.

As a port 31 of the controller 14 switches the semiconductor switching element 33 to be ON or OFF via a gate drive 32, the heater 2 is selectively connected to the +12V power source or the constant-current circuit 12 via the electrodes 6a and 6b shown in FIG. 1. When heating the heater 2, the heater 2 and the power source are connected. When measuring the temperature of the heater 2, the semiconductor switching element 33 operates so that the destination to which the heater 2 is connected is switched from the power source to the constant-current circuit 12. The level of the weak current which is supplied from the constant-current circuit 12 is controlled by the output voltage from a DAC 34.

When the heater 2 is connected to the constant-current circuit 12, a current I of a predetermined level flows from the constant-current circuit 12 to the heater 2, so that the end-to-end voltage detection circuit 13 detects the end-to-end voltage $V_R$ of the heater 2. The current I supplied from the constant-current circuit 12 is weak, and is at a level such that the heater 2 is substantially unheated (e.g., several dozen mA). Detection of the end-to-end voltage $V_R$ occurs in a short period of time (e.g., about 1 ms to about 5 ms). Since a predetermined relationship exists between the end-to-end voltage $V_R$ of the heater 2 and the temperature, it is possible to infer the temperature of the heater 2 (which also corresponds to the temperature of the sensor element 1) based on the detected voltage value.

For example, a voltage Vh which is obtained through a differential amplification (xA) of the end-to-end voltage $V_R$ of the heater 2 and the end-to-end voltage $V_T$ at 0° C. is subjected to an analog-digital conversion by the ADC 29, and the temperature is calculated by a program in the controller 14 (single-chip microcomputer). The end-to-end voltage $V_T$ at 0° C. is obtained by subjecting the output voltage from the port 35 of the controller 14 to a voltage division.

Note that, in the present preferred embodiment, the single ADC 29 is used for applying an analog-digital conversion to both outputs from the resistance-voltage conversion circuit 11 and the end-to-end voltage detection circuit 13. The timing with which the internal resistance value Rg of the sensor element 1 is measured and the timing with which the end-to-end voltage $V_R$ of the heater 2 is detected are all shifted from one another. Therefore, through the switching operation by the selector 28, it is possible to efficiently perform various analog-digital conversions by using the single ADC 29.

In the control device 100, in order to control the temperature of the heater 2, either an ON operation of supplying power to the heater 2 for heating or an OFF operation of stopping power to the heater 2 for heating is selectively performed. By performing an ON operation, the temperature of the heater 2 is increased so as to elevate the temperature of the sensor element 1. By performing an OFF operation, the temperature of the heater 2 is decreased so as to lower the temperature of the sensor element 1. However, when elevating the temperature of sensor element 1, not only an ON operation is performed, but also OFF operations are performed periodically and in short periods. The reason why OFF operations are also performed during temperature elevation is in order to measure the temperature of the heater 2. In a period when the control section is performing an OFF operation (i.e., in a period when power to the heater 2 for heating is stopped), a constant current is supplied from the constant-current circuit 12 to the heater 2, and the end-to-end voltage of the heater 2 at this time is detected by the end-to-end voltage detection circuit 13. Based on the detected voltage, the temperature of the heater 2 is determined, and the power supplied to the heater 2 can be adjusted so that the temperature of the heater 2 has a value in a predetermined range.

With the above-described construction, the control device 100 is able to perform an oxygen concentration detection with the oxygen sensor 10, while controlling the heater 2 so as to keep the temperature of the sensor element 1 under appropriate control. Hereinafter, the plurality of modes in which the heater 2 is controlled by the control section (CPU 20) of the control device 100 of the present preferred embodiment at a start will be described more specifically.

As has already been described, at a start, the control section (CPU 20) of the control device 100 controls the heater 2 in the normal mode or the delay mode, based on tilt information which is stored in the storage section (RAM 22). More specifically, when the tilt information indicates toppling of the vehicle body, the control section performs a control in the delay mode. In other words, when the tilt information indicates toppling of the vehicle body, the control section ensures that the electric power supplied to the heater 2 is temporarily suppressed or decreased relative to when the tilt information does not indicate toppling of the vehicle body.

Figure 3:
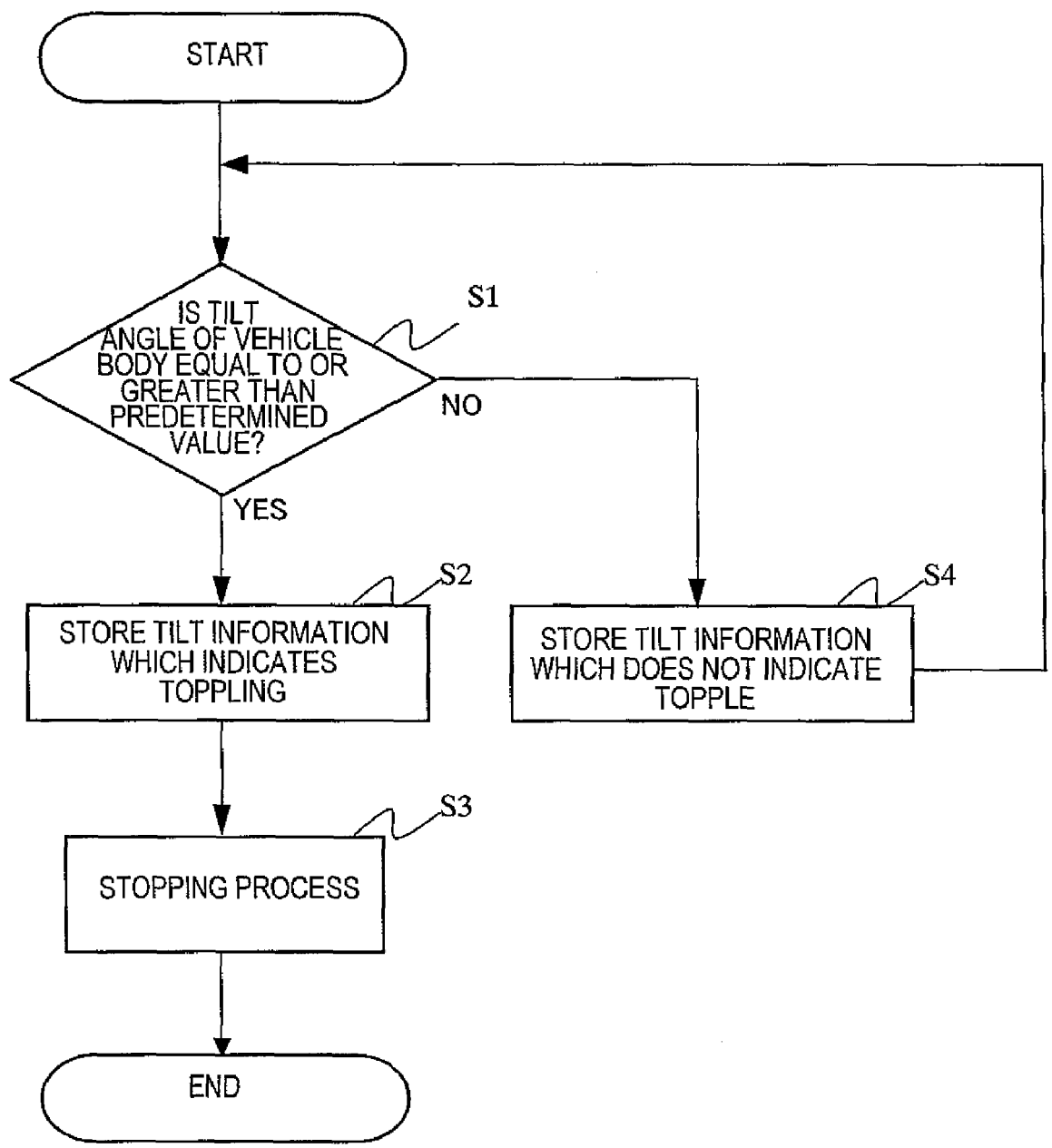
FIG. 3 is a flowchart for describing an operation of a control device according to a preferred embodiment of the present invention.

First, with reference to FIG. 3, a tilt detection operation by the tilt sensor 15 will be described. Firstly, based on a result of detection by the tilt sensor 15, it is determined whether or not the tilt angle of the vehicle body is equal to or greater than a predetermined value, thus determining whether the vehicle body is toppled or not (step S1). If the tilt angle is equal to or greater than the predetermined value, tilt information which indicates toppling is stored in the RAM 22 (step S2), and thereafter power to the internal combustion engine and the like (including power to the heater 2 in the oxygen sensor 10) is stopped (step S3). On the other hand, if the tilt angle is less than the predetermined value, tilt information which does not indicate toppling is stored in the RAM 22 (step S4), and thereafter the determination step S1 is again performed.

As a threshold for determining toppling, the maximum tilt angle of the vehicle body is typically used. The maximum tilt angle of a vehicle body means an angle beyond which the vehicle body cannot be tilted during travel, or specifically, an angle which is created when a member (a footrest, etc.) that is the first to come in contact with the ground when the vehicle body is tilted does come in contact with the ground. It will be appreciated that a value which is smaller than the maximum tilt angle may be used as the threshold.

The tilt information to be stored in the RAM 22 (which may be the storage section) may contain a determination result as to whether or not the tilt angle is equal to or greater than a predetermined value, i.e., whether toppling has occurred or not. Therefore, the tilt information does not need to contain the tilt angle of the vehicle body itself.

As the tilt sensor 15, that which is disclosed in Japanese Patent No 3512392 may be used, for example. The tilt sensor disclosed in the above publication includes a pendulum which swings in accordance with tilting of the vehicle body and a portion of which includes a magnetic field region (a region where a magnetic field occurs); and a magnetic sensor arranged to detect whether or not the magnetic field region of the pendulum constitutes a predetermined position with respect to the tilt sensor main body. Note that any tilt detection section may be used that is capable of detecting tilting of the vehicle body, without being limited to the exemplified tilt sensor. A gyrometer, a contact switch arranged to detect contact with the ground plane, or the like may be used as the tilt detection section.

Figure 4:
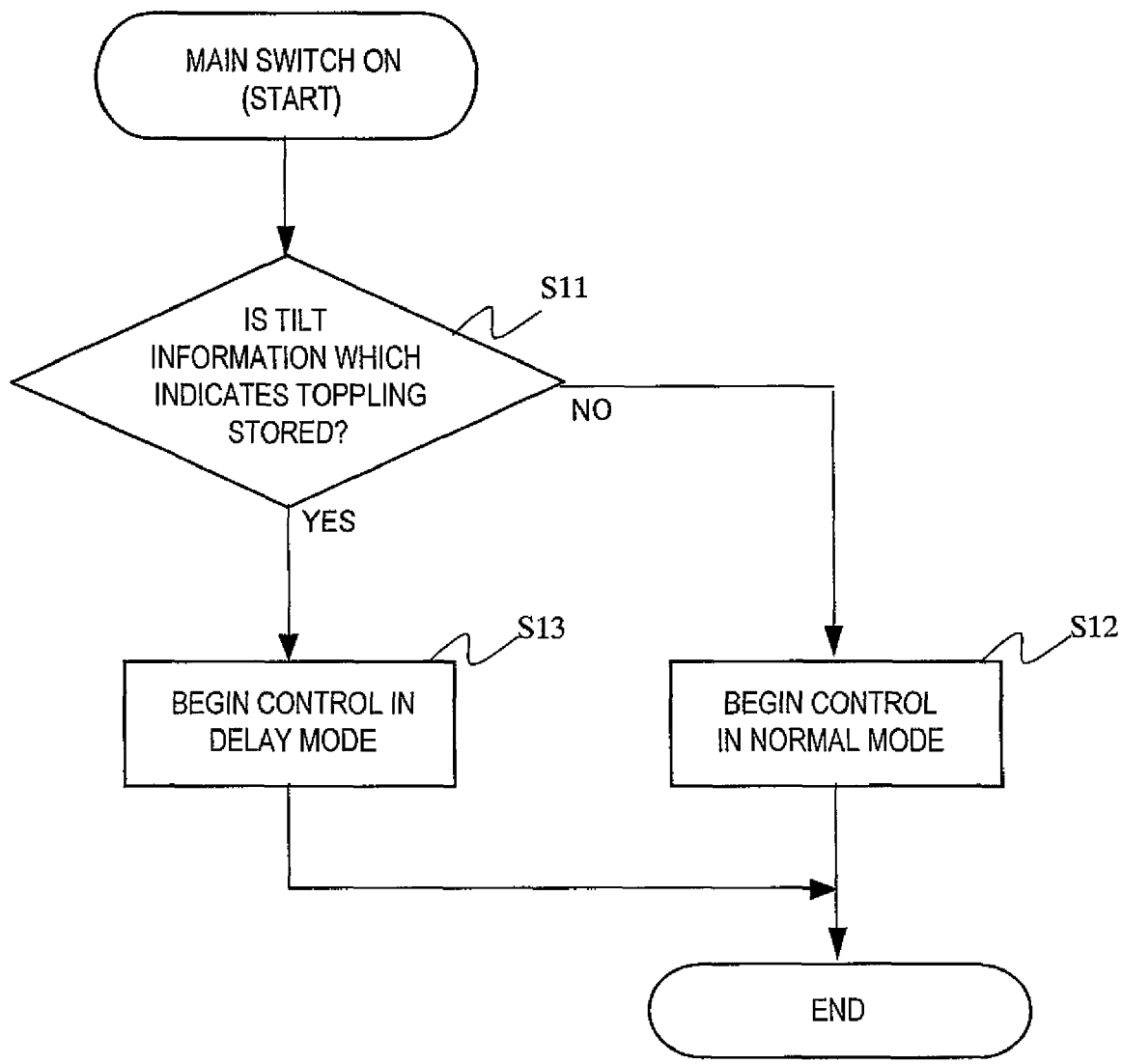
FIG. 4 is a flowchart for describing an operation of a control device according to a preferred embodiment of the present invention.

Next, with reference to FIG. 4, the operation of the control device 100 at a start will be described. When the main switch SW for setting the internal combustion engine in an operable state (i.e., supplying power to the control device 100) is turned ON, that is, when a starting operation is performed, it is determined whether or not tilt information which indicates toppling is stored (step S11). If tilt information which indicates toppling is not stored (i.e., no restarting operation after toppling), control of the heater 2 in the normal mode is begun (step S12). On the other hand, if tilt information which indicates toppling is stored (i.e., a restarting operation after toppling), control of the heater 2 in the delay mode is begun (step S13).

In the delay mode, temperature elevation is delayed relative to the normal mode. That is, in the delay mode, power to the heater 2 for heating is performed so that the timing of beginning temperature elevation and/or the rate of temperature elevation will be slower than in the normal mode. Typically, the control section does not supply any power to the heater 2 for heating in the delay mode. If power for heating is not supplied at all, temperature elevation by the heater 2 simply does not occur, whereby temperature elevation can be delayed relative to the normal mode.

It will be appreciated that some power for heating may be supplied so long as the temperature elevation is sufficiently delayed relative to the normal mode. The duty ratio for the heater in the normal mode is typically about 60% to about 100%. Therefore, by ensuring that the duty ratio for the heater 2 is about 10% or less, for example, in the delay mode, it becomes possible to sufficiently delay the temperature elevation relative to the normal mode. Note that the "duty ratio" for the heater 2 is a rate of the time during which power for heating is actually supplied (i.e., the time during which an ON operation is being performed) within a predetermined time (that is, "powering time"). From the standpoint of preventing destruction (wet cracking) of the oxygen sensor 10 with a greater certainty, the duty ratio (powering time) in the delay mode is more preferably about 5% or less, and most preferably, substantially 0% (i.e., no power for heating is supplied). Alternatively, instead of (or in addition to) lowering the duty ratio, the applied voltage to the heater 2 may be lowered so as to delay the temperature elevation.

Next, by taking as an example a case where the control section does not supply any power for heating in the delay mode, specific examples of the operation of the control section will be described with reference to FIG. 5 to FIG. 8.

Figure 5:
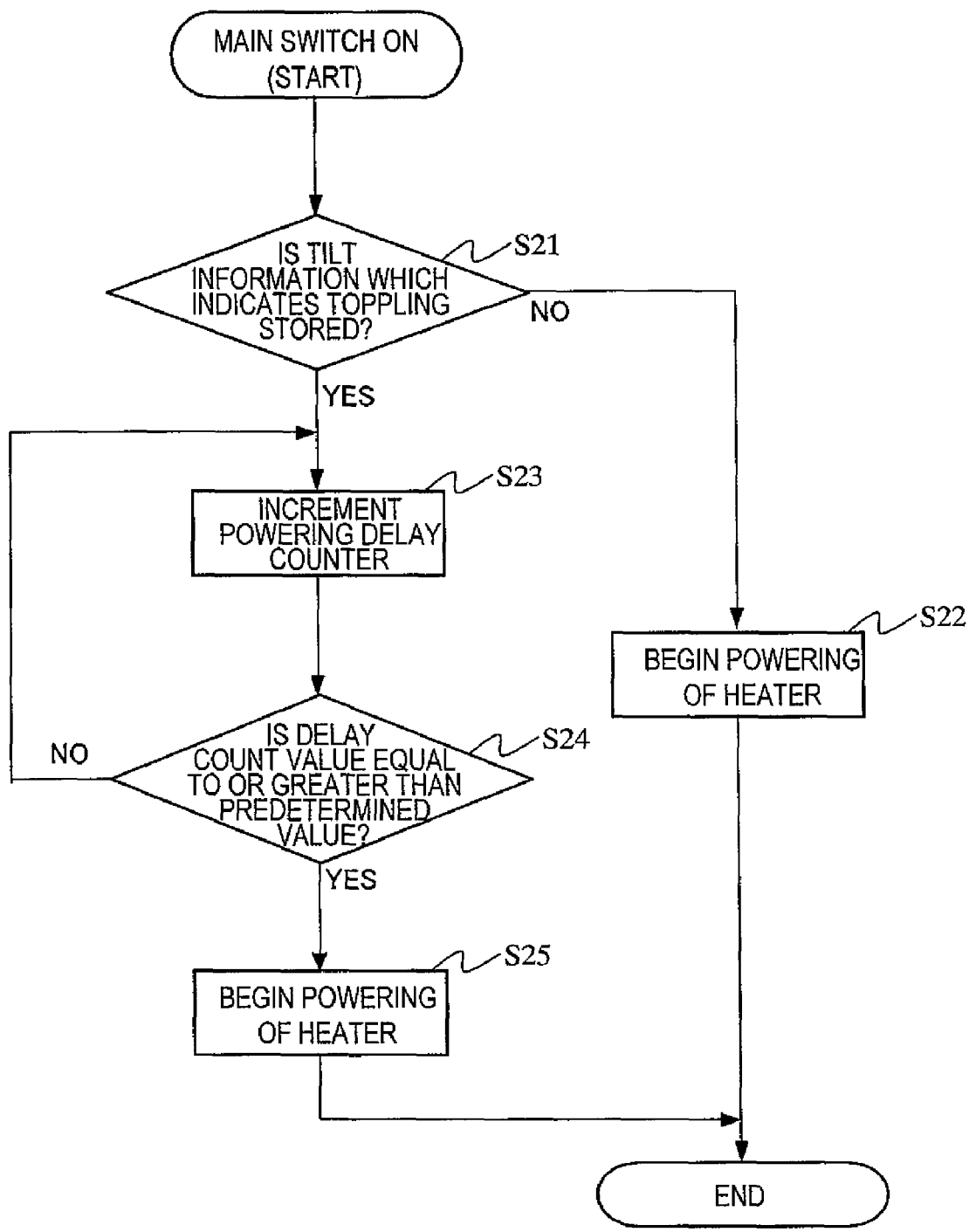
FIG. 5 is a flowchart for describing an operation of a control device according to a preferred embodiment of the present invention.

In the example shown in FIG. 5, when the tilt information indicates toppling of the vehicle body, the control section controls the heater 2 in the delay mode until a predetermined time has elapsed since the start. Specifically, when the main switch SW is turned ON, it is determined whether tilt information which indicates toppling is stored or not (step S21). If tilt information which indicates toppling is not stored, control of the heater 2 in the normal mode is begun, and power to the heater 2 for heating is begun (step S22).

On the other hand, if tilt information which indicates toppling is stored, control of the heater 2 in the delay mode is begun. Specifically, a power delay counter is incremented (i.e., its delay count value is increased) (step S23). Then, it is determined whether or not the delay count value is equal to or greater than a predetermined value corresponding to a predetermined time (which is set in advance as an amount of time by which the beginning of power is to be delayed) (step S24).

If the delay count value is less than the predetermined value, the power delay counter is again incremented (step S23), and a determination of the delay count value is performed (step S24). On the other hand, if the delay count value is equal to or greater than the predetermined value, control in the delay mode is ended, and power to the heater 2 for heating is begun (step S25). The amount of time by which the beginning of supplying power is delayed (i.e., the standby time of the heater 2) is set to a length which sufficiently allows the water accumulated within the exhaust pipe to decrease due to a flow of the exhaust gas after the start, e.g., about 10 seconds to about 30 seconds. Note that the counting of the delay time may be started at the timing of turning on the self-starting motor, rather than at the timing of turning on the main switch SW.

Thus, in the case of a restart after toppling (i.e., when the tilt information indicates toppling of the vehicle body), the heater 2 is controlled in the delay mode until the predetermined time has elapsed since the start, so that a full-scale temperature elevation by the heater 2 is performed only after the residual amount of the water in the exhaust pipe has sufficiently decreased. As a result, wet cracking of the oxygen sensor 10 can be minimized and prevented.

Figure 6:
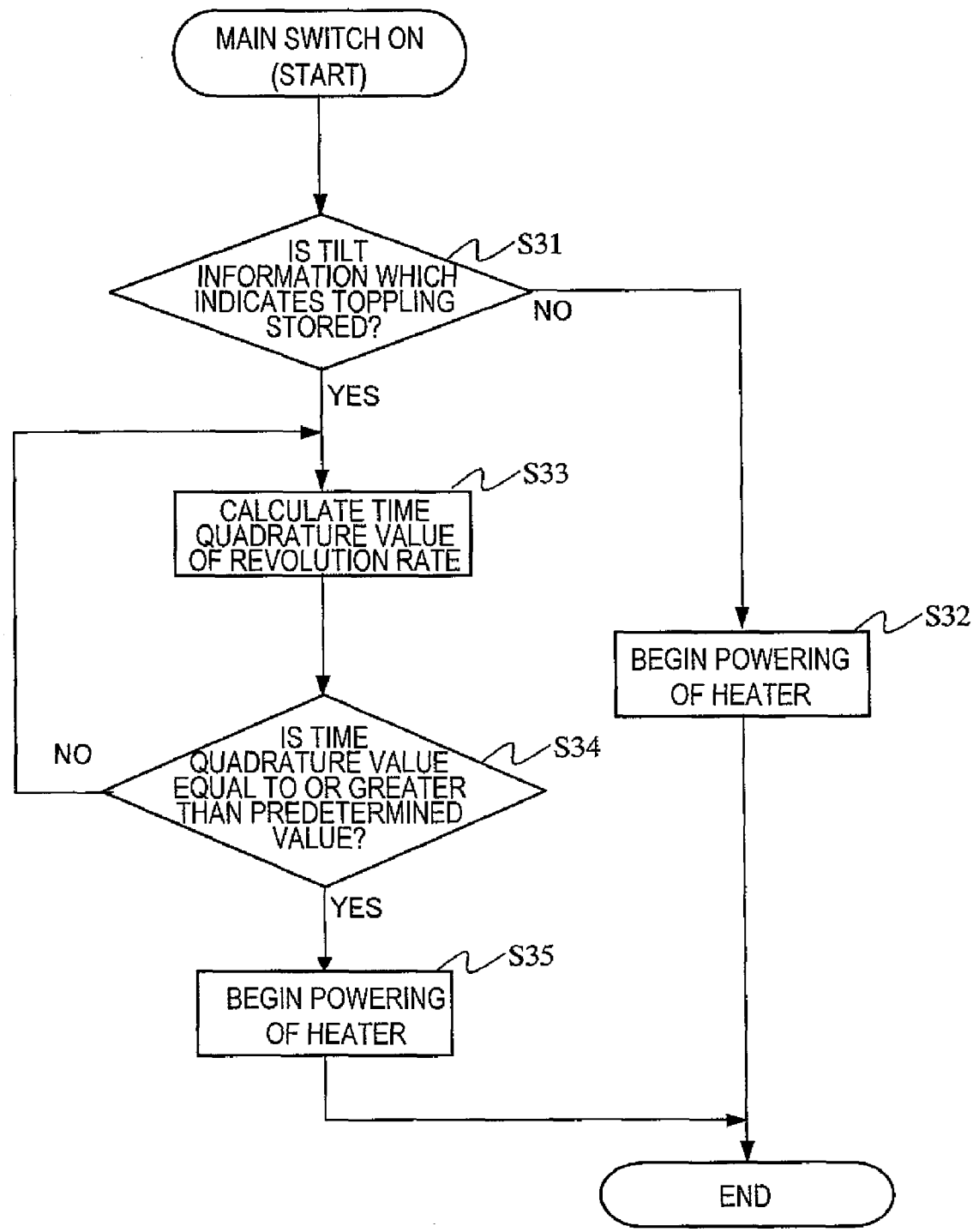
FIG. 6 is a flowchart for describing an operation of a control device according to a preferred embodiment of the present invention.

Alternatively, as shown in FIG. 6, if the tilt information indicates toppling of the vehicle body, the control section may control the heater 2 in the delay mode for a period from the start and until an operation amount of the internal combustion engine reaches a predetermined amount. As the operation amount of the internal combustion engine increases, the water having entered from the outside into the exhaust pipe will decrease. Therefore, by performing control in the delay mode until the operation amount reaches the predetermined amount, wet cracking of the oxygen sensor 10 can be minimized and prevented.

As a parameter representing an operation amount of the internal combustion engine, a time quadrature value of the revolution rate of the internal combustion engine can be used, as shown in FIG. 6, for example. In the case of using the time quadrature value of the revolution rate, the period for which the heater 2 is controlled in the delay mode is a period from the start and until the time quadrature value of the revolution rate of the internal combustion engine reaches the predetermined value.

In the example shown in FIG. 6, first, when the main switch SW is turned ON, it is determined whether tilt information which indicates toppling is stored or not (step S31). If tilt information which indicates toppling is not stored, control of the heater 2 in the normal mode is begun, and power to the heater 2 for heating is begun (step S32).

On the other hand, if tilt information which indicates toppling is stored, control of the heater 2 in the delay mode is begun. Specifically, first, a time quadrature value of the revolution rate of the internal combustion engine (corresponding to cumulative revolutions) is calculated (step S33). The revolution rate of the internal combustion engine is detected by the crank angle sensor 16. Assuming that the revolution rate is R and the time quadrature value of the revolution rate is SR, the time quadrature value SR can be determined by taking a sum of the revolution rate R for each unit time (i.e., $SR=SR_P+R$, where $SR_P$ is the time quadrature value from 1 unit time before). Then, it is determined whether or not the time quadrature value SR is equal to or greater than a predetermined value (step S34). The predetermined value serving as a determination criterion is set in advance, as an operation amount which serves as a criterion for delaying the beginning of supplying power. Note that the operation amount of the internal combustion engine can also be calculated by directly counting pulse signals which are output from the crank angle sensor 16.

If the time quadrature value SR is less than the predetermined value, calculation of the time quadrature value SR of the revolution rate (step S33) and determination of the time quadrature value SR (step S34) are performed again. On the other hand, if the time quadrature value SR is equal to or greater than the predetermined value, control in the delay mode is ended, and power to the heater 2 for heating is begun (step S35). The operation amount which serves as a criterion for delaying the beginning of supplying power is set to be an amount that allows the residual amount of the water to sufficiently decrease.

Thus, in the case of a restart after toppling (i.e., when the tilt information indicates toppling of the vehicle body), the heater 2 is controlled in the delay mode for a period until the operation amount of the internal combustion engine reaches a predetermined amount, so that a full-scale temperature elevation by the heater 2 is performed only after the residual amount of the water in the exhaust pipe has sufficiently decreased. As a result, wet cracking of the oxygen sensor 10 can be reliably prevented.

Figure 7:
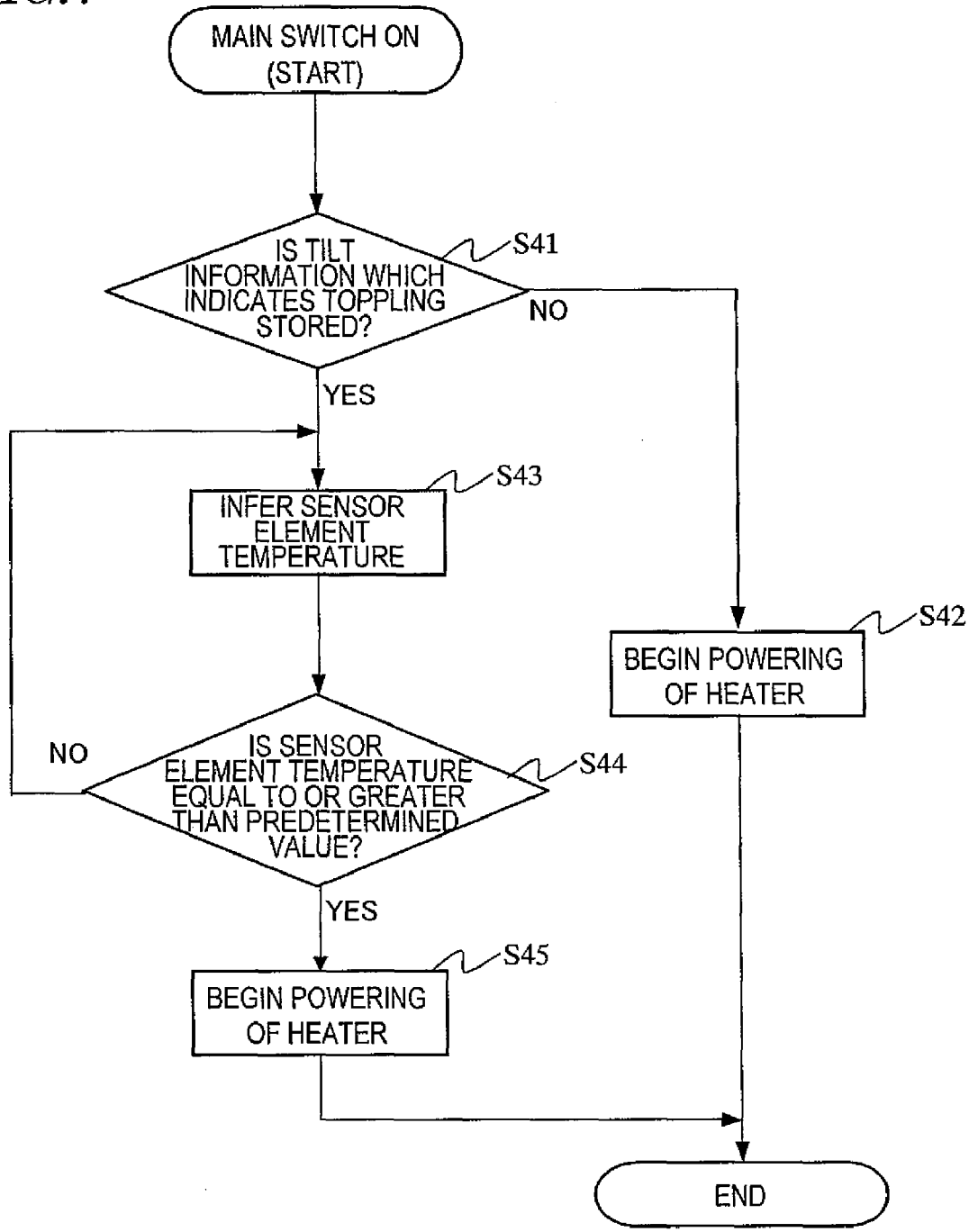
FIG. 7 is a flowchart for describing an operation of a control device according to a preferred embodiment of the present invention.

Alternatively, as shown in FIG. 7, when the tilt information indicates toppling of the vehicle body, the control section may control the heater 2 in the delay mode after the start and until the temperature of the sensor element 1 reaches a predetermined temperature. Because the water having entered into the exhaust pipe from the outside will have sufficiently decreased by the time the temperature of the sensor element 1 reaches a predetermined temperature due to the exhaust gas after the start, wet cracking of the oxygen sensor 10 can be prevented or reduced by performing control in the delay mode until the temperature of the sensor element 1 reaches the predetermined temperature.

In the example shown in FIG. 7, first, when the main switch SW is turned ON, it is determined whether tilt information which indicates toppling is stored or not (step S41). If tilt information which indicates toppling is not stored, control of the heater 2 in the normal mode is begun, and power to the heater 2 for heating is begun immediately (step S42).

On the other hand, if tilt information which indicates toppling is stored, control of the heater 2 in the delay mode is begun. Specifically, first, an inference of the temperature of the sensor element 1 is made (step S43). The technique for inferring the temperature of the sensor element 1 will be described below. Then, it is determined whether or not the temperature of the sensor element 1 is equal to or greater than a predetermined temperature (step S44). The predetermined temperature serving as a determination criterion is set in advance as a temperature which serves as a criterion for delaying the beginning of supplying power.

If the temperature of the sensor element 1 is less than the predetermined temperature, an inference of the temperature of the sensor element 1 (step S43) and a determination (step S44) are again performed. On the other hand, if the temperature of the sensor element 1 is equal to or greater than the predetermined temperature, control in the delay mode is ended, and power to the heater 2 for heating is begun (step S45). The temperature serving as a criterion for delaying the beginning of supplying power is set to be a temperature which allows the residual amount of the water to sufficiently decrease, and preferably is about 200° C., for example.

Thus, in the case of a restart after toppling (i.e., when the tilt information indicates toppling of the vehicle body), the heater 2 is controlled in the delay mode until the temperature of the sensor element 1 reaches a predetermined temperature, so that a full-scale temperature elevation by the heater 2 is performed only after the residual amount of the water in the exhaust pipe has sufficiently decreased. As a result, wet cracking of the oxygen sensor 10 can be prevented.

Now, a technique of inferring the temperature of the sensor element 1 will be described.

The control section of the control device 100 is able to infer the temperature of the sensor element 1 based on the measurement value of a temperature sensor which is provided near the oxygen sensor 10, for example. As such a temperature sensor, the exhaust temperature sensor 17 as shown in FIG. 2 can be used. From the standpoint of accurately inferring the temperature of the sensor element 1, it is preferable that, within the exhaust pipe, the distance between the position where the exhaust temperature sensor 17 is provided and the position where the oxygen sensor 10 is provided is short. Specifically, by ensuring that this distance is about 500 mm or less, it becomes possible to infer the temperature of the sensor element 1 with a sufficiently high accuracy. Preferably, the exhaust temperature sensor 17 is disposed between the oxygen sensor 10 and a catalyst (typically ternary catalyst).

Alternatively, the control section may infer the temperature of the sensor element 1 based on an internal resistance value of the sensor element 1. In the case of the resistancetype sensor element 1 exemplified in FIG. 1, the internal resistance value of the sensor element 1 refers to a resistance value of the oxide semiconductor layer 3. The resistance value of the oxide semiconductor layer 3 not only has oxygen partial pressure dependence but also has temperature dependence. Moreover, at the start, the oxide semiconductor layer 3 is not activated, so that feedback control near the stoichiometric air-fuel ratio is difficult. Therefore, a feed-forward control is performed which is not based on a detection signal (representing oxygen concentration) that is output from the oxygen sensor 10. Specifically, an air-fuel ratio control is performed so that the air-fuel ratio takes an appropriate value on the rich side. Therefore, the oxygen partial pressure in the exhaust gas at this time is almost constant. Thus, by detecting the resistance value of the oxide semiconductor layer 3, it is possible to infer the temperature of the sensor element 1. In the case of an electromotive force-type sensor element, the internal resistance value of the sensor element refers to the resistance value of a solid electrolyte layer. Since the resistance value of the solid electrolyte layer also has temperature dependence, it is possible to infer the temperature of the sensor element by detecting the resistance value of the solid electrolyte layer.

Note that, in the case where a heater 2 whose resistance value has temperature dependence is provided, as exemplified in the present preferred embodiment, the control section may infer the temperature of the sensor element 1 based on the resistance value of the heater 2. Since the heater 2 and the sensor element 1 are in contact with each other, the temperature of the sensor element 1 can be inferred by inferring the temperature of the heater 2 from the resistance value of the heater 2.

Moreover, in the case where the sensor element 1 contains a temperature compensation material arranged to compensate for the temperature dependence of a sensor output, the control section may infer the temperature of the sensor element 1 based on the resistance value of the temperature compensation material. A temperature compensation material for compensating for the temperature dependence of a sensor output is disclosed in Japanese Laid-Open Patent Publication No. 2004-85549, for example. The temperature compensation material which is disclosed in this publication is a temperature compensation material for a resistancetype sensor element. The resistance value of an oxide semiconductor layer has dependence on both temperature and oxygen partial pressure, whereas the resistance value of a temperature compensation material which is made of an oxygen ion conductor has dependence on temperature but hardly any dependence on oxygen partial pressure. The materials of the oxide semiconductor layer and the temperature compensation material are selected so that the temperature dependence of the resistance value of the oxide semiconductor layer and the temperature dependence of the resistance value of the temperature compensation material are as close as possible. By providing such a temperature compensation material on the same substrate as the oxide semiconductor layer (and so as to have a series of electrical connections), it becomes possible to compensate for the temperature dependence of the sensor output. As has already been described, since the resistance value of the temperature compensation material has temperature dependence, the temperature of the sensor element 1 can be inferred by detecting the resistance value of the temperature compensation material.

Now, the operation of the control device 100 in the present preferred embodiment will be described more specifically, with reference to a timing chart.

Figure 8:
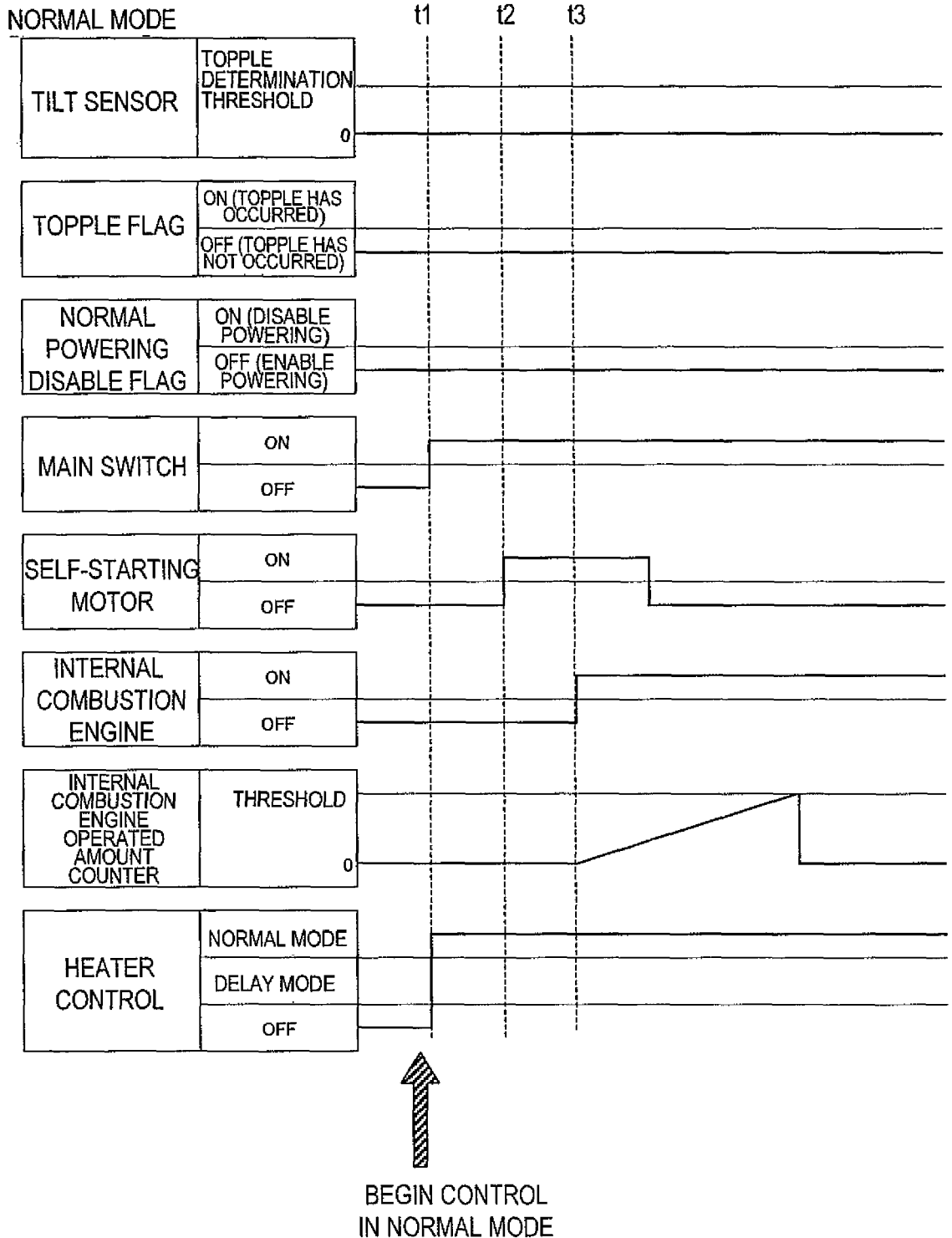
FIG. 8 is a timing chart for describing an operation of a control device according to a preferred embodiment of the present invention, illustrating the case where normal mode control is performed at starting.

FIG. 8 is a timing chart in the case where control in the normal mode is performed at the start. As shown in FIG. 8, at a normal start (as opposed to a restart after toppling), neither a flag (topple flag) indicating occurrence of a toppling nor a flag disabling normal powering (normal powering disable flag) is set (i.e., they are OFF). Therefore, at the same time as the main switch SW is turned ON (i.e., at the same time as the start), control of the heater 2 in the normal mode is begun (time $t_1$ in FIG. 8).

As is also shown in FIG. 8, the timing with which a self-starting motor is activated (i.e., turned ON) falls slightly behind the timing with which the main switch SW is turned ON (time $t_2$ in FIG. 8). The timing with which the internal combustion engine is activated (i.e., turned ON) falls slightly behind the timing with which the self-starting motor is activated (time $t_3$ in FIG. 8). Moreover, at the same time as the internal combustion engine is activated, counting of the operation amount (e.g., a time quadrature value of the revolution rate) of the internal combustion engine is begun. However, since the example shown in FIG. 8 does not illustrate a restart after toppling, the heater 2 is controlled in the normal mode regardless of whether or not the operation amount is equal to or greater than the threshold.

Figure 9:
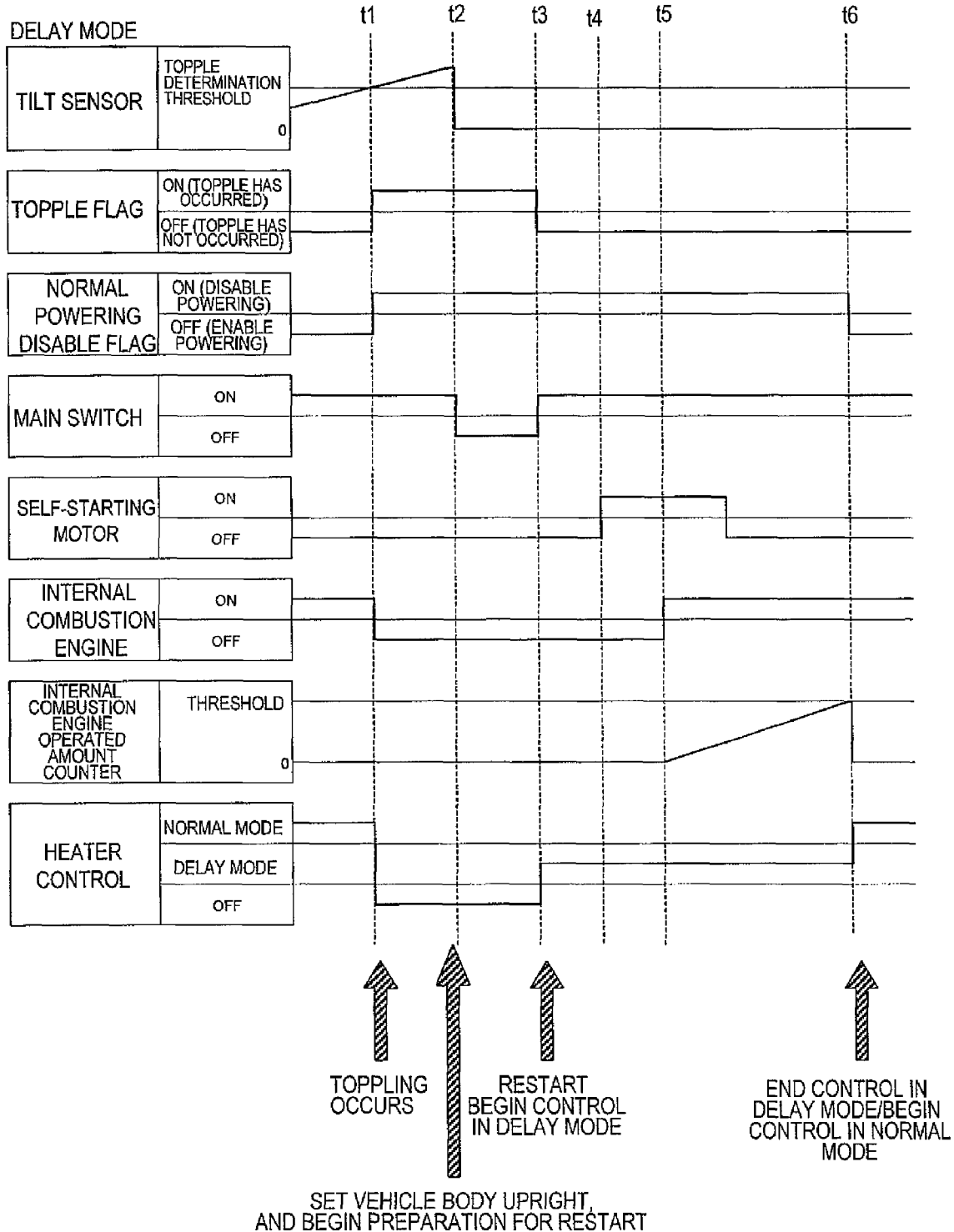
FIG. 9 is a timing chart for describing an operation of a control device according to a preferred embodiment of the present invention, illustrating the case where delay mode control is performed at starting.

FIG. 9 is a timing chart in the case where control in the delay mode is performed at the start. In other words, FIG. 9 illustrates a case where the vehicle body topples, and thereafter the driver sets the vehicle body upright and restarts it. As shown in FIG. 9, first, a toppling of the vehicle body occurs, and if a tilt which is detected by the tilt sensor 15 exceeds the threshold for topple determination (time $t_1$ in FIG. 9), a topple flag and a normal powering disable flag are set (i.e., become ON). At this time (when toppling has occurred), the internal combustion engine is stopped, and power to the heater 2 is also stopped (i.e., both are OFF).

Next, when the main switch SW is temporarily turned OFF and the vehicle body is set upright (i.e., preparation for a restart is begun), the tilt which is detected by the tilt sensor 15 becomes zero (time $t_2$ in FIG. 9). Then, when the main switch SW is again turned ON (i.e., restarted), control of the heater 2 in the delay mode is begun because the normal powering disable flag has been set (time $t_3$ in FIG. 9). At this time, the topple flag is canceled.

Thereafter, the self-starting motor is activated (time $t_4$ in FIG. 9), and then the internal combustion engine is activated (time $t_5$ in FIG. 9). At the same time as activation of the internal combustion engine, counting of the operation amount of the internal combustion engine is begun. When the operation amount becomes equal to or greater than the threshold, the normal powering disable flag is canceled (time $t_6$ in FIG. 9). As a result, control in the delay mode is ended, and control in the normal mode (i.e., normal powering for heating) is begun.

As described above, the control device 100 of the present preferred embodiment includes a control section which, at the start, controls the heater in any of a plurality of modes including a normal mode and a delay mode based on tilt information. As a result, wet cracking of the oxygen sensor 10 can be prevented.

Next, an example of an automotive vehicle incorporating the control device 100 of the present preferred embodiment will be described. The control device 100 of the present preferred embodiment is suitably used for a motorcycle 300 as shown in FIG. 10, for example.

Figure 10:
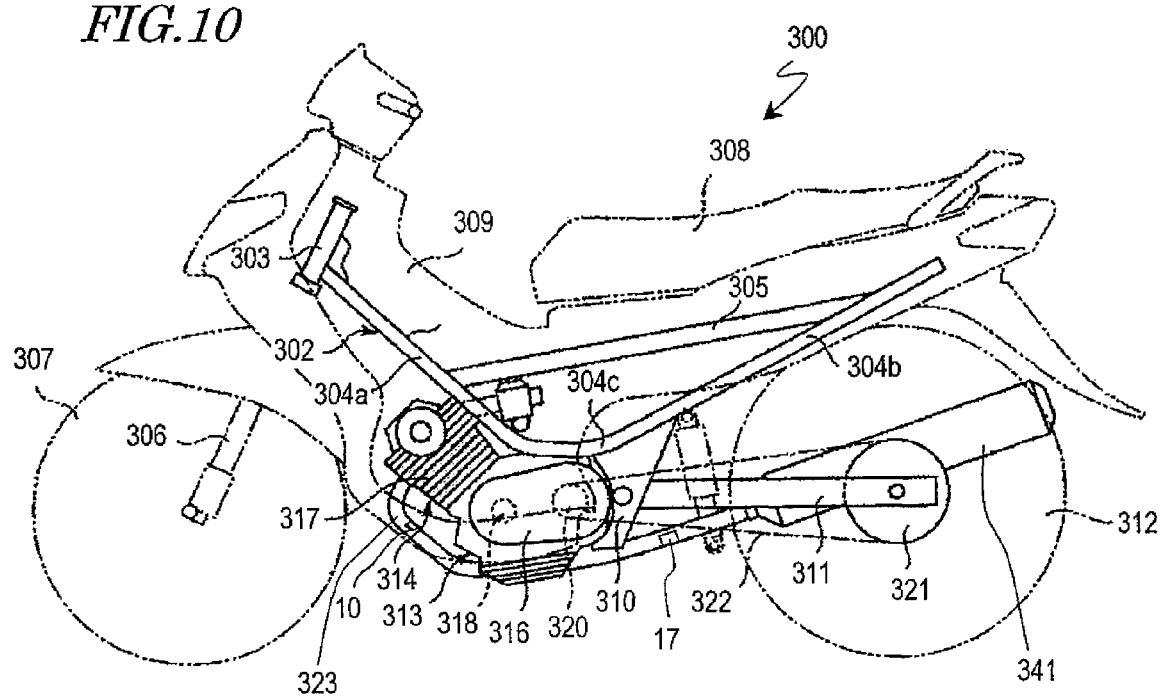
FIG. 10 is a diagram schematically showing an example of a motorcycle having a control device according to a preferred embodiment of the present invention.

The motorcycle 300 shown in FIG. 10 includes a frame 302 which is a backbone of the vehicle body. The frame 302 includes a steering head pipe 303, a pair of main pipes 304 (only one of them is shown), and a pair of seat rails 305 (only one of them is shown).

The steering head pipe 303 is positioned at the front end of the frame 302, and supports a front wheel 307 via front forks 306. Each main pipe 304 extends from the steering head pipe 303 toward the rear. Each main pipe 304 preferably includes a fore portion 304a, a hind portion 304b, and an intermediate portion 304c position therebetween. The fore portion 304a extends obliquely downward from the steering head pipe 303. The intermediate portion 304c extends generally horizontally from the lower end of the fore portion 304a. The hind portion 304b extends obliquely upward from the rear end of the intermediate portion 304c.

Each seat rail 305 bridges between the fore portion 304a and the hind portion 304b of the corresponding main pipe 304. The seat rails 305 support a seat 308. A vehicle body cover 309 continues from the lower end of the seat 308. The frame 302 is covered by the vehicle body cover 309.

A rear arm bracket 310 is affixed to the intermediate portion 304c of each main pipe 304. The rear arm bracket 310 protrudes below from the intermediate portion 304c of the main pipe 304. The rear arm bracket 310 supports a rear arm 311. The rear arm 311 protrudes toward the rear from the rear arm bracket 310. A rear wheel 312 is supported at the rear ends of the rear arms 311.

The frame 302 supports a power unit 313 which drives the rear wheel 312. The power unit 313 includes an internal combustion engine (engine) 314, which is a driving source, and a belt-type continuously variable transmission (not shown). The power unit 313 is obscured by a lower portion of the vehicle body cover 309.

The internal combustion engine 314 is suspended from the fore portions 304a of the main pipe 304. The internal combustion engine 314 includes a crankcase 316 and a cylinder 317 which is connected to the crankcase 316.

The crankcase 316 accommodates a crankshaft 318 and a gear speed reducer (not shown). The crankshaft 318 is supported by the crankcase 316 via a bearing (not shown), and is disposed horizontally along the vehicle width direction of the motorcycle 300. The gear speed reducer has drive sprockets 320 at its output end. The drive sprockets 320 are positioned at the rear of the crankshaft 318. A chain 322 is wound around the drive sprockets 320 and driven sprockets 321 of the rear wheel 312.

The cylinder 317 of the internal combustion engine 314 protrudes upward from the crankcase 316 so as to follow along the fore portions 304a of the main pipe 304. The cylinder 317 accommodates a piston (not shown).

An exhaust pipe 323 is connected to an exhaust port of the internal combustion engine 314. An exhaust temperature sensor 17 and an oxygen sensor 10 are provided on the exhaust pipe 323. The exhaust pipe 323 extends obliquely upward (i.e., in a direction tilted upward from the horizontal direction) at the downstream side. The top end of the oxygen sensor 10 is exposed in a passage within the exhaust pipe 323 in which exhaust gas travels. Thus, the oxygen sensor 10 detects the oxygen concentration within the exhaust gas. The oxygen sensor 10 has the heater 2 as shown in FIG. 1 attached thereto. As the temperature of the sensor element 1 is elevated by the heater 2 at the start of the internal combustion engine 314 (e.g., elevated to 700° C. in 5 seconds in the normal mode), the detection sensitivity of the oxide semiconductor layer 3 is enhanced.

Figure 11:
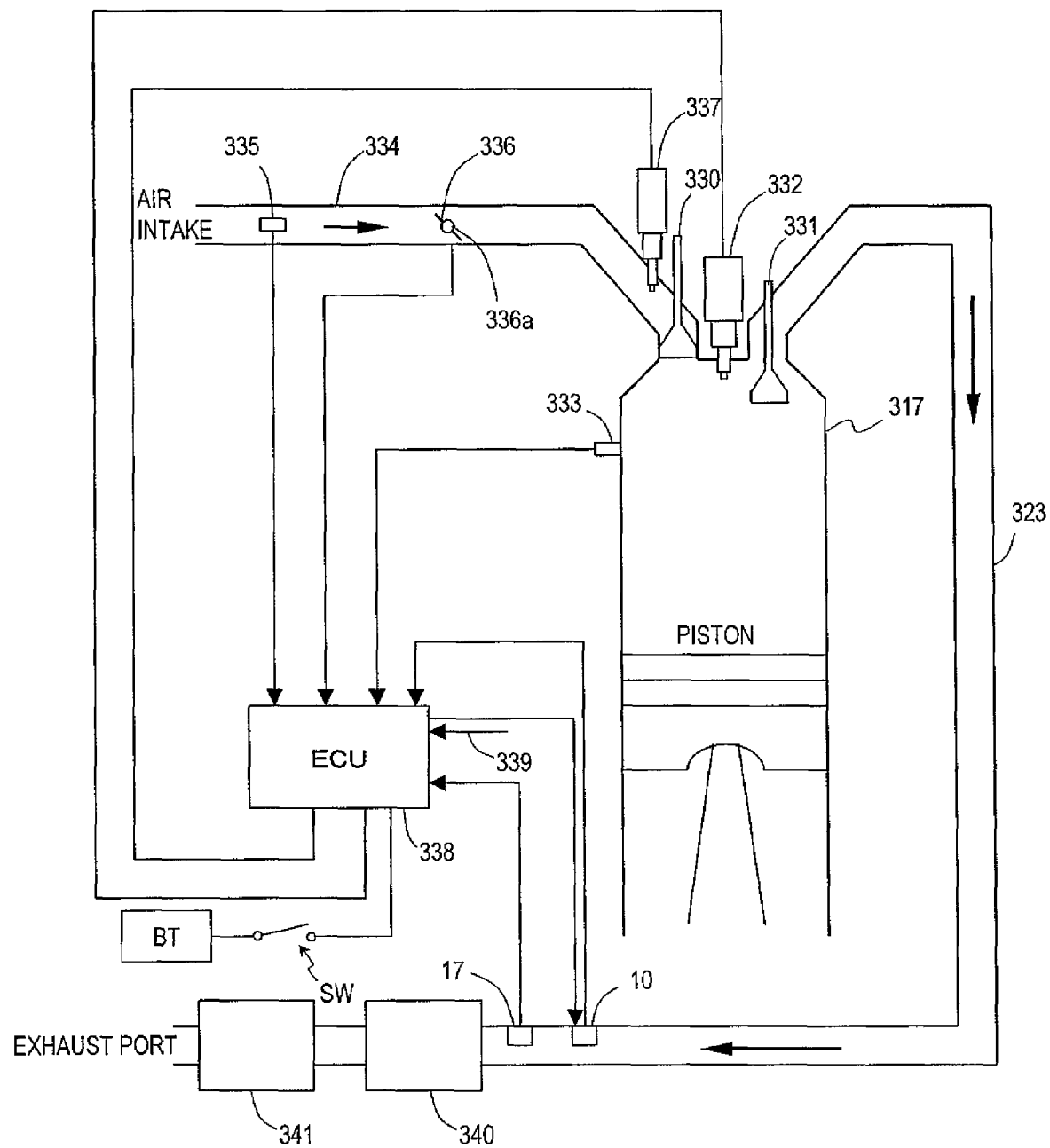
FIG. 11 is a diagram schematically showing a control system for an internal combustion engine of the motorcycle shown in FIG. 10.
Figure 12:
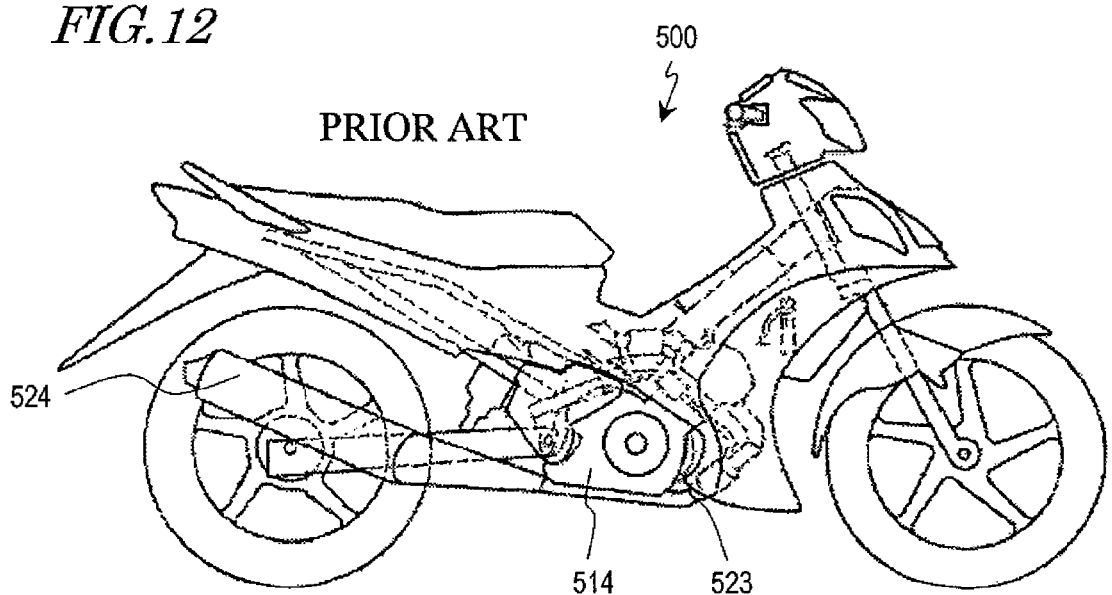
FIG. 12 is a diagram schematically showing an example of a conventional motorcycle.
Figure 13:
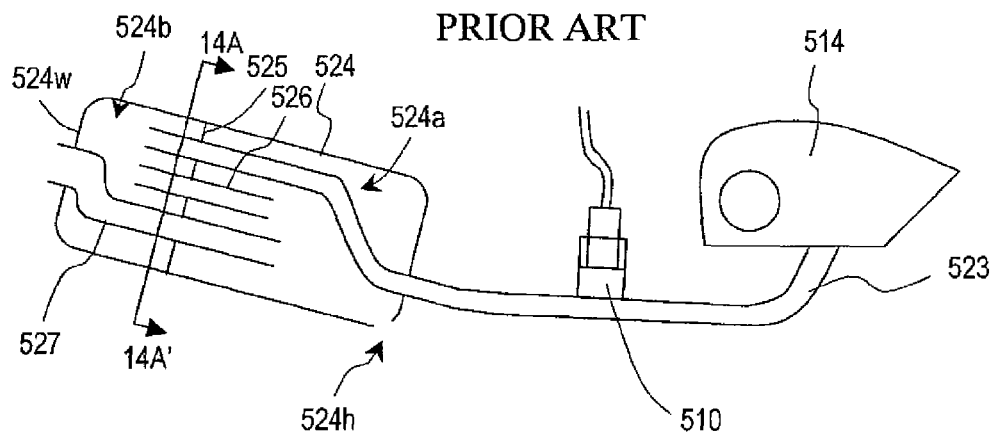
FIG. 13 is a diagram schematically showing an internal combustion engine, an exhaust pipe, a muffler, and an oxygen sensor included in the motorcycle shown in FIG. 12.
Figure 14:
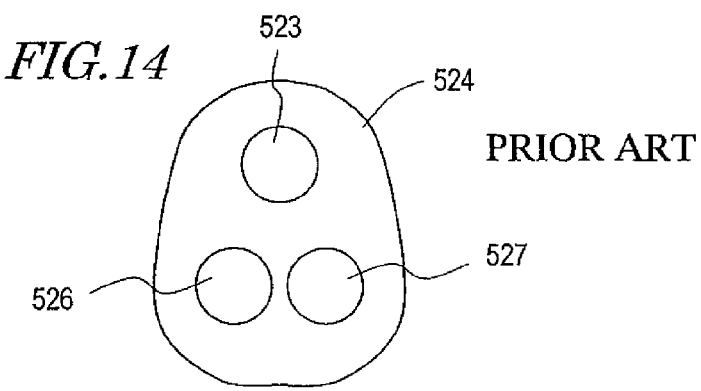
FIG. 14 is a cross-sectional view taken along line 14A-14A' in FIG. 13.
Figure 15:
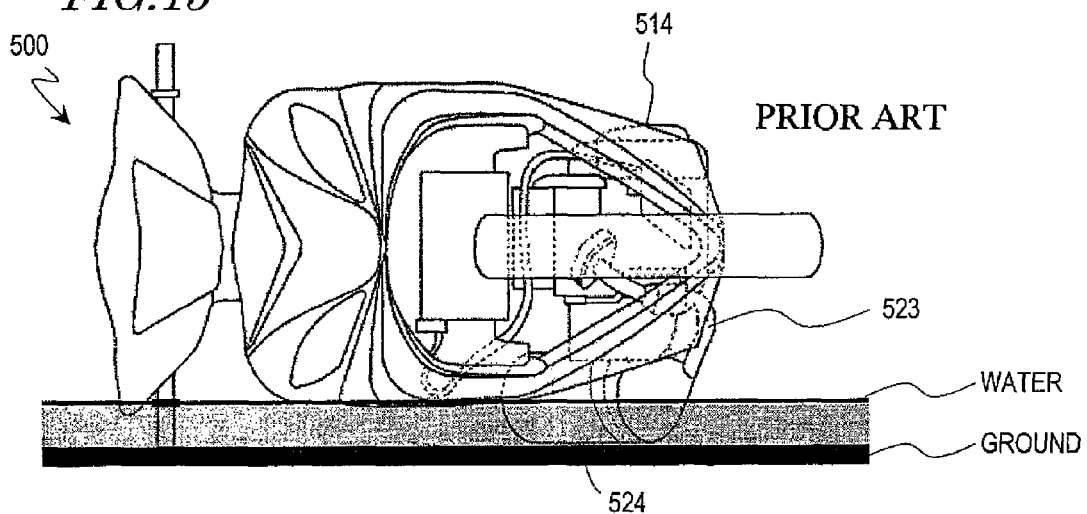
FIG. 15 is a diagram schematically showing the motorcycle shown in FIG. 12 having toppled on an area of the ground which is covered with water.
Figure 16:
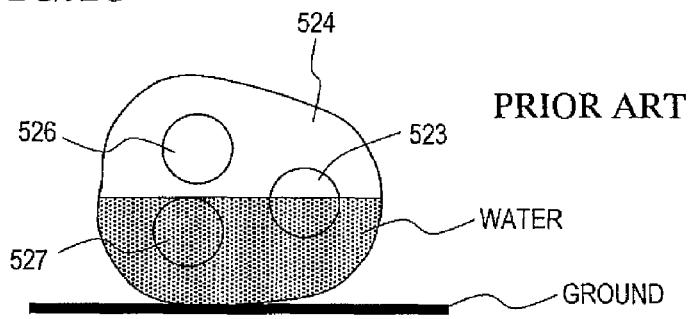
FIG. 16 is a diagram showing a cross-section of a muffler when a motorcycle has toppled as shown in FIG. 15.
Figure 17:
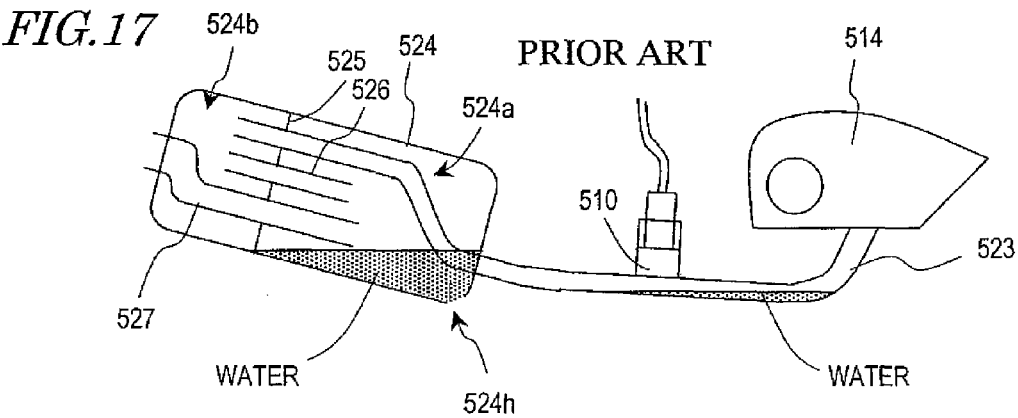
FIG. 17 is a diagram schematically showing water accumulating in the exhaust pipe when the vehicle body is set upright after a motorcycle has toppled.

FIG. 11 shows main component elements of a control system of the internal combustion engine 314. On a cylinder 317 of the internal combustion engine 314, an intake valve 330, an exhaust valve 331, and a spark plug 332 are provided. There is also provided a water temperature sensor 333 for measuring the water temperature of the cooling water with which to cool the internal combustion engine 314. The intake valve 330 is connected to an intake manifold 334, which has an air intake. On the intake manifold 334, an airflow meter 335, a throttle valve 336, a throttle sensor 336a, and a fuel injector 337 are provided. Instead of the airflow meter 335, a vacuum sensor may be provided between the throttle valve 336 and the intake valve 330, and the intake amount may be measured.

The airflow meter 335, the throttle sensor 336a, the fuel injector 337, the water temperature sensor 333, the spark plug 332, the oxygen sensor 10, and the exhaust temperature sensor 17 are connected to an ECU (electrical control unit) 338. A vehicle velocity signal 339, which represents the velocity of the motorcycle 300, is also input to the ECU 338. The ECU 338 encompasses a large portion (i.e., portions other than the various sensors) of the control device 100 shown in FIG. 2. The ON or OFF of power to the ECU 338 from a battery BT is controlled by a main switch SW.

When a rider starts the internal combustion engine 314 by using a self-starting motor (not shown), the ECU 338 calculates an optimum fuel amount based on detection signals and the vehicle velocity signal 339 obtained from the airflow meter 335, the throttle sensor 336a, the water temperature sensor 333, and the exhaust temperature sensor 17, and based on the result of the calculation, outputs a control signal to the fuel injector 337. The fuel which is injected from the fuel injector 337 is mixed with the air which is supplied from the intake manifold 334, and injected into the cylinder 317 via the intake valve 330, which is opened or closed with appropriate timing. The fuel which is injected into the cylinder 317 combusts to become exhaust gas, which is led to the exhaust pipe 323 via the exhaust valve 331. On the exhaust pipe 323, a ternary catalyst 340 and a muffler 341 are provided in addition to the oxygen sensor 10 and the exhaust temperature sensor 17.

The oxygen sensor 10 detects the oxygen in the exhaust gas, and outputs a detection signal to the ECU 338. Based on the signal from the oxygen sensor 10, the ECU 338 determines the amount of deviation of the air-fuel ratio from an ideal air-fuel ratio. Then, the amount of fuel which is injected from the fuel injector 337 is controlled so as to attain the ideal air-fuel ratio relative to the air amount which is known from the signals obtained from the airflow meter 335 and the throttle sensor 336a. Thus, an air-fuel ratio controller which includes the oxygen sensor 10 and the ECU 338 connected to the oxygen sensor 10 appropriately controls the air-fuel ratio of the internal combustion engine.

Note that the ECU 338 and the various sensors shown in FIG. 11 preferably function as the control device 100 shown in FIG. 2. In other words, the main constituent elements other than sensors of the control device 100 (a microcomputer constituting the controller 14, and the like) are preferably mounted on or provided in the ECU 338.

In the motorcycle 300 incorporating the control device 100 of the present preferred embodiment, wet cracking of the oxygen sensor 10 is prevented, and therefore the oxygen sensor 10 has a long life. Therefore, fuel and air can be mixed at an appropriate air-fuel ratio for a long period of time, so that fuel can be combusted under optimum conditions.

The control device according to various preferred embodiments of the present invention is applicable to automotive vehicles at large, without being limited to the illustrated motorcycle; however, preferred embodiments of the present invention are especially preferably applied to saddle riding vehicles. Saddle riding vehicles (including not only motorcycles and tricycles but also ATVs such as buggies), on which a rider rides, are likely to topple, and therefore water is likely to enter into the exhaust pipe, which adds to the significance of utilizing the control device of the preferred embodiments of the present invention. In a saddle riding vehicle in which the exhaust pipe extends obliquely upward at the downstream side (e.g., the motorcycle 300 shown in FIG. 10), water is likely to stay accumulated near the oxygen sensor when the toppled vehicle body is set upright, thus adding to the significance of the control device of the preferred embodiments of the present invention.

According to the preferred embodiments of the present invention, there is provided a control device capable of preventing wet cracking of an oxygen sensor that is associated with water which has entered into an exhaust pipe from the outside due to tilting of the vehicle body. A control device according to preferred embodiments of the present invention is suitably used in an air-fuel ratio controller for an automotive vehicle.

While preferred embodiments of the present invention have been described above, it is to be understood that variations and modifications will be apparent to those skilled in the art without departing the scope and spirit of the present invention. The scope of the present invention, therefore, is to be determined solely by the following claims.

This application is based on Japanese Patent Application No. 2007-310651 filed on Nov. 30, 2007, the entire contents of which are hereby incorporated by reference. Furthermore, the entire contents of Japanese Patent Application No. 2008-295972 filed on Nov. 19, 2008, are hereby incorporated by reference.

What is claimed is:

1. A control device for controlling an oxygen sensor for a vehicle, the oxygen sensor having a sensor element and a heater for elevating a temperature of the sensor element, the control device comprising:
   a tilt detection section arranged to detect tilting of a body of the vehicle;
   a storage section arranged to store tilt information in accordance with a result of detection by the tilt detection section; and
   a control section having a plurality of operation modes including a normal mode and a delay mode, the control section arranged to control, at a start of an engine of the vehicle, the heater in one of the normal mode and the delay mode in which temperature elevation of the sensor element is delayed relative to the normal mode, based on the tilt information stored in the storage section.

2. The control device of claim 1, wherein the control section is arranged to control a duty ratio of the heater to be about 10% or less in the delay mode.

3. The control device of claim 1, wherein the control section is arranged not to supply power to the heater during the delay mode.

4. The control device of claim 1, wherein, when the tilt information indicates toppling of the vehicle body, the control section controls the heater in the delay mode from the start and until a predetermined time has elapsed.

5. The control device of claim 1, wherein, when the tilt information indicates toppling of the vehicle body, the control section controls the heater in the delay mode for a period from the start and until an operation amount of an internal combustion engine reaches a predetermined amount.

6. The control device of claim 5, wherein the period is a period from the start and until a time quadrature value of a revolution rate of the internal combustion engine reaches a predetermined value.

7. The control device of claim 1, wherein, when the tilt information indicates toppling of the vehicle body, the control section controls the heater in the delay mode from the start and until a temperature of the sensor element has reached a predetermined temperature.

8. The control device of claim 7, wherein the control section is arranged to infer the temperature of the sensor element based on an internal resistance value of the sensor element.

9. The control device of claim 7, wherein the control section is arranged to infer the temperature of the sensor element based on a resistance value of the heater.

10. An air-fuel ratio controller comprising the control device of claim 1.

11. An automotive vehicle comprising the air-fuel ratio controller of claim 10.

12. The automotive vehicle of claim 11, wherein the automotive vehicle is a saddle riding vehicle.

13. The automotive vehicle of claim 12, further comprising an exhaust pipe arranged to extend obliquely upward at a downstream side.

14. A control device for controlling an oxygen sensor for an vehicle, the oxygen sensor having a sensor element and a heater for elevating a temperature of the sensor element, the control device comprising:

a tilt detection section arranged to detect tilting of a body of the vehicle;

a storage section arranged to store tilt information in accordance with a result of detection by the tilt detection section; and a control section arranged to control, at a start of an engine of the vehicle, the heater based on the tilt information stored in the storage section; wherein when the tilt information indicates toppling of the vehicle body, the control section ensures that electric power supplied to the heater is temporarily suppressed relative to when the tilt information does not indicate toppling of the vehicle body.

* * * * *